United States Patent
Ogawa et al.

(10) Patent No.: US 11,171,808 B2
(45) Date of Patent: Nov. 9, 2021

(54) SWITCH DEVICE, COMMUNICATION CONTROL METHOD, AND RECORDING MEDIUM

(71) Applicants: Sumitomo Electric Industries, Ltd., Osaka (JP); AutoNetworks Technologies, Ltd., Yokkaichi (JP); Sumitomo Wiring Systems, Ltd., Yokkaichi (JP)

(72) Inventors: Akihiro Ogawa, Osaka (JP); Hirofumi Urayama, Osaka (JP); Koichi Takayama, Osaka (JP); Takeshi Hagihara, Yokkaichi (JP); Yasuhiro Yabuuchi, Yokkaichi (JP)

(73) Assignees: Sumitomo Electric Industries, Ltd., Osaka (JP); AutoNetworks Technologies, Ltd., Yokkaichi (JP); Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 16/621,730

(22) PCT Filed: Mar. 20, 2018

(86) PCT No.: PCT/JP2018/011092
§ 371 (c)(1),
(2) Date: Dec. 12, 2019

(87) PCT Pub. No.: WO2018/230069
PCT Pub. Date: Dec. 20, 2018

(65) Prior Publication Data
US 2020/0136861 A1    Apr. 30, 2020

(30) Foreign Application Priority Data
Jun. 14, 2017  (JP) .............................. JP2017-116855

(51) Int. Cl.
*H04L 12/44*  (2006.01)
*H04L 12/939*  (2013.01)

(52) U.S. Cl.
CPC ............ *H04L 12/44* (2013.01); *H04L 49/552* (2013.01); *H04L 2012/445* (2013.01)

(58) Field of Classification Search
CPC ......... H04L 47/10; H04L 47/17; H04L 47/30; H04L 12/44; H04L 49/552
See application file for complete search history.

(56) References Cited

U.S. PATENT DOCUMENTS

| 6,996,119 B2* | 2/2006 | Koo ........................ H04L 47/10 370/449 |
| 2012/0173900 A1* | 7/2012 | Diab ................. H04L 12/40045 713/310 |

FOREIGN PATENT DOCUMENTS

| CN | 106817287 A | 6/2017 |
| JP | 2009-159481 A | 7/2009 |

(Continued)

*Primary Examiner* — Chandrahas B Patel
(74) *Attorney, Agent, or Firm* — Baker Botts L.L.P.; Michael A. Sartori

(57) ABSTRACT

A switch device is a switch device that relays data in an in-vehicle network and including a plurality of first communication ports which are connectable to a plurality of functional units in a vehicle, and includes a plurality of first communication circuits disposed corresponding to the first communication ports and capable of communicating with the functional units via the corresponding first communication ports, one or more second communication circuits different from the plurality of first communication circuits, a switching unit capable of switching a connection destination of each of the first communication ports between the corresponding first communication circuit and the second communication circuit, and a control unit that controls the switching unit such that a connection destination of a target (Continued)

port which is the first communication port serving as a target is switched to the second communication circuit when a predetermined condition is satisfied.

6 Claims, 22 Drawing Sheets

(56) References Cited

FOREIGN PATENT DOCUMENTS

| | | | |
|---|---|---|---|
| JP | 2015-088815 A | 5/2015 |
| JP | 2016-012932 A | 1/2016 |
| JP | 2017-046052 A | 3/2017 |
| WO | 2006/030499 A | 3/2006 |

\* cited by examiner

| TRANSMISSION DESTINATION MAC ADDRESS | OUTPUT DESTINATION (LOGICAL PORT NUMBER) |
|---|---|
| MAC ADDRESS OF AUTOMATED DRIVING ECU 111A | #1 |
| MAC ADDRESS OF SENSOR 111B | #2 |
| MAC ADDRESS OF NAVIGATION DEVICE 111C | #3 |
| MAC ADDRESS OF SWITCH DEVICE | #0 |

FIG. 13

| COMMUNICATION PORT | STATE OF CORRESPONDING CHANGEOVER SWITCH |
|---|---|
| COMMUNICATION PORT 54A | NORMAL CONNECTION STATE |
| COMMUNICATION PORT 54B | NORMAL CONNECTION STATE |
| COMMUNICATION PORT 54C | NORMAL CONNECTION STATE |

FIG. 14

| COMMUNICATION PORT | SWITCHING PRIORITY |
|---|---|
| COMMUNICATION PORT 54A | 3 |
| COMMUNICATION PORT 54B | 2 |
| COMMUNICATION PORT 54C | 1 |

FIG. 15

| COMMUNICATION PORT | STATE OF CORRESPONDING CHANGEOVER SWITCH |
|---|---|
| COMMUNICATION PORT 54A | FIRST REDUNDANT CONNECTION STATE |
| COMMUNICATION PORT 54B | NORMAL CONNECTION STATE |
| COMMUNICATION PORT 54C | NORMAL CONNECTION STATE |

FIG. 16

| TRANSMISSION DESTINATION MAC ADDRESS | OUTPUT DESTINATION (LOGICAL PORT NUMBER) |
|---|---|
| MAC ADDRESS OF AUTOMATED DRIVING ECU 111A | #4 |
| MAC ADDRESS OF SENSOR 111B | #2 |
| MAC ADDRESS OF NAVIGATION DEVICE 111C | #3 |
| MAC ADDRESS OF SWITCH DEVICE | #0 |

FIG. 17

| COMMUNICATION PORT | STATE OF CORRESPONDING CHANGEOVER SWITCH |
|---|---|
| COMMUNICATION PORT 54A | FIRST REDUNDANT CONNECTION STATE |
| COMMUNICATION PORT 54B | NORMAL CONNECTION STATE |
| COMMUNICATION PORT 54C | SECOND REDUNDANT CONNECTION STATE |

FIG. 18

| TRANSMISSION DESTINATION MAC ADDRESS | OUTPUT DESTINATION (LOGICAL PORT NUMBER) |
|---|---|
| MAC ADDRESS OF AUTOMATED DRIVING ECU 111A | #4 |
| MAC ADDRESS OF SENSOR 111B | #2 |
| MAC ADDRESS OF NAVIGATION DEVICE 111C | #5 |
| MAC ADDRESS OF SWITCH DEVICE | #0 |

FIG. 19

| COMMUNICATION PORT | STATE OF CORRESPONDING CHANGEOVER SWITCH |
|---|---|
| COMMUNICATION PORT 54A | FIRST REDUNDANT CONNECTION STATE |
| COMMUNICATION PORT 54B | SECOND REDUNDANT CONNECTION STATE |
| COMMUNICATION PORT 54C | NORMAL CONNECTION STATE |

FIG. 20

| TRANSMISSION DESTINATION MAC ADDRESS | OUTPUT DESTINATION (LOGICAL PORT NUMBER) |
|---|---|
| MAC ADDRESS OF AUTOMATED DRIVING ECU 111A | #4 |
| MAC ADDRESS OF SENSOR 111B | #5 |
| MAC ADDRESS OF NAVIGATION DEVICE 111C | NULL |
| MAC ADDRESS OF SWITCH DEVICE | #0 |

FIG. 28

| COMMUNICATION PORT | STATE OF CORRESPONDING CHANGEOVER SWITCH |
|---|---|
| COMMUNICATION PORT 54A | NORMAL CONNECTION STATE |
| COMMUNICATION PORT 54B | NORMAL CONNECTION STATE |
| COMMUNICATION PORT 54C | NORMAL CONNECTION STATE |
| BACKUP COMMUNICATION PORT 55 | INSPECTION CONNECTION STATE |

FIG. 29

| COMMUNICATION PORT | SWITCHING PRIORITY |
|---|---|
| COMMUNICATION PORT 54A | 3 |
| COMMUNICATION PORT 54B | 2 |
| COMMUNICATION PORT 54C | 1 |
| BACKUP COMMUNICATION PORT 55 | 0 |

FIG. 30

| COMMUNICATION PORT | STATE OF CORRESPONDING CHANGEOVER SWITCH |
|---|---|
| COMMUNICATION PORT 54A | NORMAL CONNECTION STATE |
| COMMUNICATION PORT 54B | NORMAL CONNECTION STATE |
| COMMUNICATION PORT 54C | REDUNDANT CONNECTION STATE |
| BACKUP COMMUNICATION PORT 55 | REDUNDANT CONNECTION STATE |

FIG. 31

| TRANSMISSION DESTINATION MAC ADDRESS | OUTPUT DESTINATION (LOGICAL PORT NUMBER) |
|---|---|
| MAC ADDRESS OF AUTOMATED DRIVING ECU 111A | #1 |
| MAC ADDRESS OF SENSOR 111B | #2 |
| MAC ADDRESS OF NAVIGATION DEVICE 111C | #4 |
| MAC ADDRESS OF SWITCH DEVICE | #0 |

SWITCH DEVICE, COMMUNICATION CONTROL METHOD, AND RECORDING MEDIUM

CROSS-REFERENCE TO RELATED APPLICATIONS

This application is the national phase under 35 U.S.C. § 371 of PCT International Application No. PCT/JP2018/011092 which has an International filing date of Mar. 20, 2018 and designated the United States of America.

FIELD

The present disclosure relates to a switch device, a communication control method and a communication control program.

This application claims the benefit of Japanese Patent Application No. 2017-116855, filed on Jun. 14, 2017, the entire contents of which are incorporated herein by reference.

BACKGROUND

The following station side device is disclosed in Japanese Patent Laid-Open Publication No. 2016-12932.

That is, a station side device includes operating system (currently used) OSUs 1 to N, a standby system (spare) OSUN+1, and a control unit. The control unit transfers management information of an ONU linked to a logical line with a network management system (NMS). The logical line is defined by a fixed combination of an optical line unit and a passive optical network. On the other hand, the OSU acquires the management information linked to a physical line. The physical line indicates an actual combination of the optical line unit and the passive optical network. The control unit converts a line linked to the management information between the logical line and the physical line using mapping information.

SUMMARY (1) A switch device of the present disclosure is a switch device that relays data in an in-vehicle network and including a plurality of first communication ports which are connectable to a plurality of functional units in a vehicle, and includes a plurality of first communication circuits disposed corresponding to the first communication ports and capable of communicating with the functional units via the corresponding first communication ports, one or more second communication circuits different from the plurality of first communication circuits, a switching unit capable of switching a connection destination of each of the first communication ports between the corresponding first communication circuit and the second communication circuit, and a control unit that controls the switching unit such that a connection destination of a target port which is the first communication port serving as a target is switched to the second communication circuit when a predetermined condition is satisfied.

(7) A communication control method of the present disclosure is a communication control method in a switch device that relays data in an in-vehicle network and includes a plurality of first communication ports which are connectable to a plurality of functional units in a vehicle, a plurality of first communication circuits disposed corresponding to the first communication ports and capable of communicating with the functional units via the corresponding first communication ports, one or more second communication circuits different from the plurality of first communication circuits, and a switching unit capable of switching a connection destination of each of the first communication ports between the corresponding first communication circuit and the second communication circuit, and includes a step of determining whether or not a predetermined condition is satisfied and a step of controlling the switching unit such that a connection destination of a target port which is the first communication port serving as a target is switched to the second communication circuit when the predetermined condition is satisfied.

(8) A computer readable non-transitory recording medium of the present disclosure is a computer readable non-transitory recording medium recording a communication control program used in a switch device that relays data in an in-vehicle network and includes a plurality of first communication ports which are connectable to a plurality of functional units in a vehicle, a plurality of first communication circuits disposed corresponding to the first communication ports and capable of communicating with the functional units via the corresponding first communication ports, one or more second communication circuits different from the plurality of first communication circuits, and a switching unit capable of switching a connection destination of each of the first communication ports between the corresponding first communication circuit and the second communication circuit, and causes a computer to function as a control unit that controls the switching unit such that a connection destination of a target port which is the first communication port serving as a target is switched to the second communication circuit when a predetermined condition is satisfied.

One aspect of the present disclosure can be realized not only as a switch device including such a characteristic processing unit but also as an in-vehicle communication system including a switch device. Further, one aspect of the present disclosure can be realized as a semiconductor integrated circuit that realizes a part or all of the switch device.

The above and further objects and features of the invention will more fully be apparent from the following detailed description with accompanying drawings.

BRIEF DESCRIPTION OF THE DRAWINGS

FIG. 13 is a diagram illustrating an example of a changeover switch state table held in an MPU in the switch device according to the second embodiment of the present disclosure.

FIG. 14 is a diagram illustrating an example of a priority table held in the MPU in the switch device according to the second embodiment of the present disclosure.

FIG. 15 is a diagram illustrating an example of a changeover switch state table held in the MPU in the switch device according to the second embodiment of the present disclosure.

FIG. 16 is a diagram illustrating an example of an ARL table held in a switch unit in the switch device according to the second embodiment of the present disclosure.

FIG. 17 is a diagram illustrating an example of a changeover switch state table held in the MPU in the switch device according to the second embodiment of the present disclosure.

FIG. 18 is a diagram illustrating an example of an ARL table held in the switch unit in the switch device according to the second embodiment of the present disclosure.

FIG. 19 is a diagram illustrating an example of a changeover switch state table held in the MPU in the switch device according to the second embodiment of the present disclosure.

FIG. 20 is a diagram illustrating an example of an ARL table held in the switch unit in the switch device according to the second embodiment of the present disclosure.

FIG. 28 is a diagram illustrating an example of a changeover switch state table held in an MPU in the switch device according to the third embodiment of the present disclosure.

FIG. 29 is a diagram illustrating an example of a priority table held in the MPU in the switch device according to the third embodiment of the present disclosure.

FIG. 30 is a diagram illustrating an example of a changeover switch state table held in the MPU in the switch device according to the third embodiment of the present disclosure.

FIG. 31 is a diagram illustrating an example of an ARL table held in the switch unit in the switch device according to the third embodiment of the present disclosure.

Figure 1:
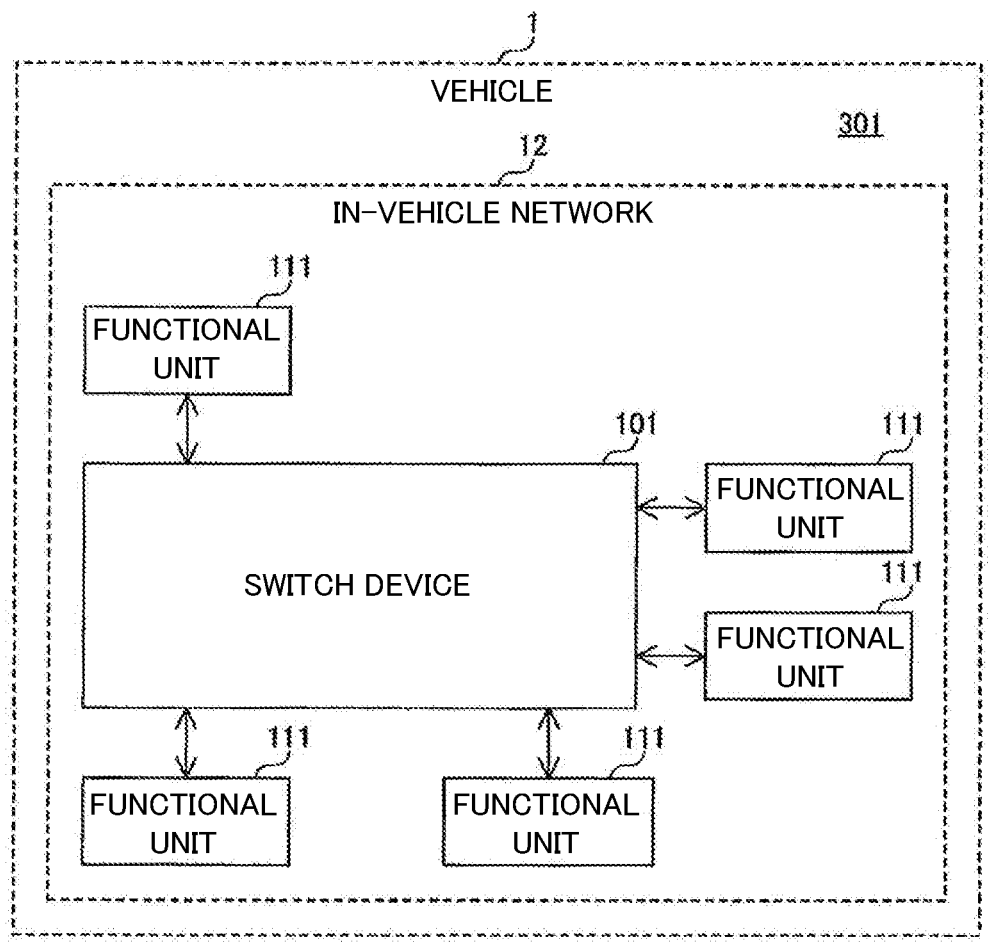
FIG. 1 is a diagram illustrating a configuration of an in-vehicle communication system according to a first embodiment of the present disclosure.

In the past, in order to provide high-quality services, a technique for performing system duplexing (redundancy) has been developed.

In a vehicle in which a plurality of functional units are disposed, there are cases in which a switch device that relays data which is transmitted and received between functional units is disposed. In a case in which a communication circuit for communicating with a functional unit is unable to be used in the switch device, communication between the switch device and the functional unit is disconnected, and transmission and reception of data between the functional units is not performed normally. A technique capable of achieving a more stable operation of the switch device is desired due to system redundancy, but such redundancy is not disclosed in Japanese Patent Laid-Open Publication No. 2016-12932.

The present disclosure was made to solve the above-described problems, and it is an object of the present disclosure to provide a switch device, a communication control method, and a communication control program which are capable of realizing a more stable operation of a switch device that relays data in an in-vehicle network.

According to the present disclosure, it is possible to realize a more stable operation of a switch device that relays data in an in-vehicle network.

First, exemplary embodiments of the present disclosure will be described.

(1) A switch device according to an embodiment of the present disclosure is a switch device that relays data in an in-vehicle network and including a plurality of first communication ports which are connectable to a plurality of functional units in a vehicle, and includes a plurality of first communication circuits disposed corresponding to the first communication ports and capable of communicating with the functional units via the corresponding first communication ports, one or more second communication circuits different from the plurality of first communication circuits, a switching unit capable of switching a connection destination of each of the first communication ports between the corresponding first communication circuit and the second communication circuit, and a control unit that controls the switching unit such that a connection destination of a target port which is the first communication port serving as a target is switched to the second communication circuit when a predetermined condition is satisfied.

With such a configuration, when a predetermined condition such that a condition that the first communication circuit is unable to be used is satisfied, the connection destination of the first communication port corresponding to the first communication circuit is switched to the second communication circuit, and the functional unit connected to the first communication port, that is, the target port can communicate with the second communication circuit via the target port, so that the appropriate redundancy of the communication circuit can be realized. Accordingly, since the functional unit can continue communication with the switch device, it is possible to prevent transmission and reception of data between the functional unit and other functional units from being not normally performed. Therefore, a more stable operation of the switch device that relays data can be realized in the in-vehicle network.

(2) Preferably, the predetermined condition is an occurrence of an abnormality in the first communication circuit, and the target port is the first communication port corresponding to the first communication circuit in which the abnormality occurs.

With such a configuration, even when an abnormality occurs in the first communication circuit, and the first communication circuit is unable to be used, the functional unit connected to the first communication port corresponding to the first communication circuit, that is, the target port can communicate with the second communication circuit via the target port and can thus continue the communication with the switch device.

(3) Preferably, when the control unit switches the connection destination of the target port to the second communication circuit, in a case in which the second communication circuit is already connected to another first communication port, the control units determines which of the target port and the other first communication port is to be connected to the second communication circuit.

With such a configuration, for example, it is possible to maintain the connection between the second communication circuit and another first communication port or to switch the connection destination of the second communication circuit from another first communication port to the target port on the basis of the determination result. That is, it is possible to prevent the first communication port connected to the second communication circuit from being fixed.

(4) More preferably, the control unit performs the determination in accordance with a priority of each of the plurality of first communication ports.

With such a configuration, for example, the first communication port with the higher priority can be connected to the second communication circuit, and thus it is possible to reduce a possibility of an abnormal failure in transmission and reception of data from the functional unit connected to the first communication port with the higher priority.

(5) More preferably, the switch device further includes a second communication port different from the plurality of first communication ports, the second communication circuit is capable of communicating with another device via the second communication port, the switching unit is further capable of switching the presence or absence of a connection between the second communication port and the second communication circuit, and the priority of the second communication port is set to the lowest priority.

With such a configuration, for example, in a case in which each first communication circuit operates normally, it is possible to perform the communication between another device and the switch device by connecting the second communication port with the second communication circuit, and in a case in which the first communication circuit is unable to be used, the connection destination of the second communication circuit can be automatically switched to the target port with the higher priority.

(6) Preferably, the switch device further includes a second communication port different from the plurality of first communication ports, and the second communication circuit is capable of communicating with another device via the second communication port.

With such a configuration, the second communication circuit can be used for communication with another device in addition to the redundant switching of the first communication circuit.

(7) A communication control method according to an embodiment of the present disclosure is a communication control method in a switch device that relays data in an in-vehicle network and includes a plurality of first communication ports which are connectable to a plurality of functional units in a vehicle, a plurality of first communication circuits disposed corresponding to the first communication ports and capable of communicating with the functional units via the corresponding first communication ports, one or more second communication circuits different from the plurality of first communication circuits, and a switching unit capable of switching a connection destination of each of the first communication ports between the corresponding first communication circuit and the second communication circuit, and includes a step of determining whether or not a predetermined condition is satisfied and a step of controlling the switching unit such that a connection destination of a target port which is the first communication port serving as a target is switched to the second communication circuit when the predetermined condition is satisfied.

With such a configuration, when a predetermined condition such that a condition that the first communication circuit is unable to be used is satisfied, the connection destination of the first communication port corresponding to the first communication circuit is switched to the second communication circuit, and the functional unit connected to the first communication port, that is, the target port can communicate with the second communication circuit via the target port, so that the appropriate redundancy of the communication circuit can be realized. Accordingly, since the functional unit can continue communication with the switch device, it is possible to prevent transmission and reception of data between the functional unit and other functional units from being not normally performed. Therefore, a more stable operation of the switch device that relays data can be realized in the in-vehicle network.

(8) A computer readable non-transitory recording medium according to an embodiment of the present disclosure is a computer readable non-transitory recording medium recording a communication control program used in a switch device that relays data in an in-vehicle network and includes a plurality of first communication ports which are connectable to a plurality of functional units in a vehicle, a plurality of first communication circuits disposed corresponding to the first communication ports and capable of communicating with the functional units via the corresponding first communication ports, one or more second communication circuits different from the plurality of first communication circuits, and a switching unit capable of switching a connection destination of each of the first communication ports between the corresponding first communication circuit and the second communication circuit, and causes a computer to function as a control unit that controls the switching unit such that a connection destination of a target port which is the first communication port serving as a target is switched to the second communication circuit when a predetermined condition is satisfied.

With such a configuration, when a predetermined condition such that a condition that the first communication circuit is unable to be used is satisfied, the connection destination of the first communication port corresponding to the first communication circuit is switched to the second communication circuit, and the functional unit connected to the first communication port, that is, the target port can communicate with the second communication circuit via the target port, so that the appropriate redundancy of the communication circuit can be realized. Accordingly, since the functional unit can continue communication with the switch device, it is possible to prevent transmission and reception of data between the functional unit and other functional units from being not normally performed. Therefore, a more stable operation of the switch device that relays data can be realized in the in-vehicle network.

Hereinafter, exemplary embodiments of the present disclosure will be described with reference to the appended drawings. Incidentally, in the drawings, the same or corresponding parts are denoted by the same reference numerals and description thereof will not be repeated. Also, some of embodiments to be described below may be arbitrarily combined.

First Embodiment

[Configuration and Basic Operation]

FIG. 1 is a diagram illustrating a configuration of an in-vehicle communication system according to a first embodiment of the present disclosure.

Referring to FIG. 1, an in-vehicle communication system 301 includes a switch device 101 and a plurality of functional units 111. The in-vehicle communication system 301 is installed in a vehicle 1.

The functional unit 111 is, for example, an automated driving electronic control unit (ECU), a sensor, a navigation device, a telematics communication unit (TCU), a central gateway (CGW), a human machine interface, a camera, or the like and can communicate with the switch device 101.

For example, a connection relation of the switch device 101 and each functional unit 111 in an in-vehicle network 12 of the vehicle 1 is fixed.

The switch device 101 and the functional unit 111 are connected to each other, for example, by a cable for in-vehicle Ethernet (registered trademark) communication (hereinafter also referred to as an "Ethernet cable").

The switch device 101 and the functional unit 111 communicate with each other using the Ethernet cable.

Information is exchanged between the switch device 101 and the functional unit 111 using, for example, an Ethernet frame conforming to IEEE 802.3.

Figure 2:
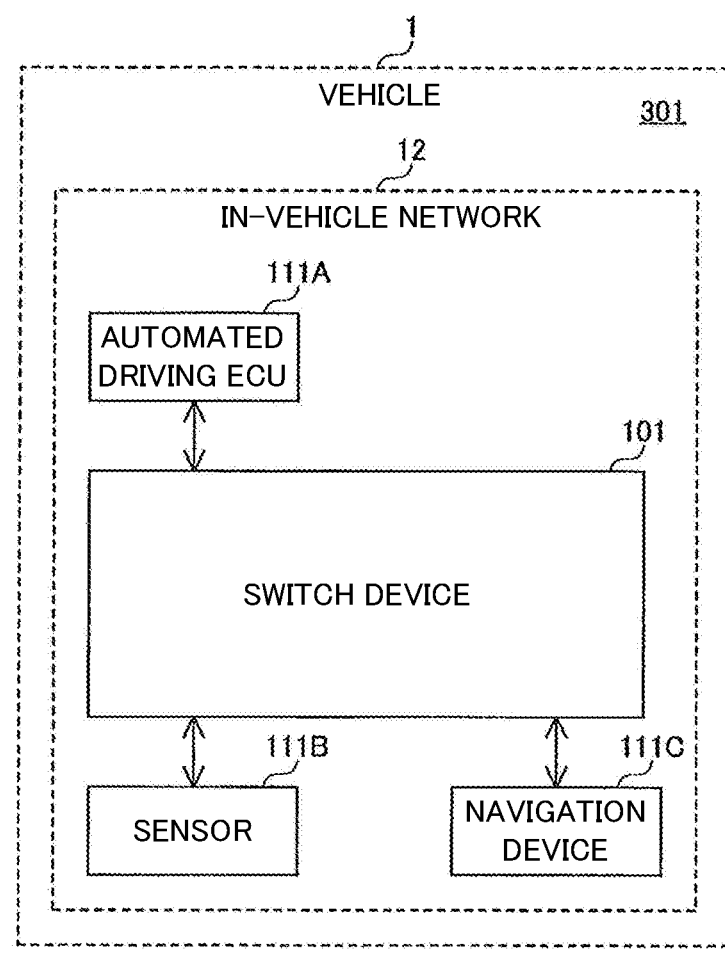
FIG. 2 is a diagram illustrating an application example of the in-vehicle communication system according to the first embodiment of the present disclosure.

FIG. 2 is a diagram illustrating an application example of the in-vehicle communication system according to the first embodiment of the present disclosure. In FIG. 2, as specific examples of the functional unit 111, an automated driving ECU 111A, a sensor 111B, and a navigation device 111C are illustrated.

Incidentally, the in-vehicle communication system 301 is not limited to the configuration including the three functional units 111 and may be configured to include two or four or more functional units 111.

In the in-vehicle network 12, for example, the automated driving ECU 111A belongs to a subnet different from the sensor 111B and the navigation device 111C.

In the in-vehicle network 12, for example, information is transmitted and received using an IP packet in accordance with an Internet protocol (IP) protocol. The IP packet is stored in an Ethernet frame and transmitted.

The switch device 101 relays data in the in-vehicle network 12. Specifically, the switch device 101 relays the Ethernet frame transmitted among the automated driving ECU 111A, the sensor 111B, and the navigation device 111C.

In detail, the switch device 101 operates in accordance with a communication protocol having a plurality of layers. More specifically, the switch device 101 can function as a layer 2 (L2) switch, and relays an Ethernet frame transmitted between the functional units 111 belonging to the same subnet.

In this example, the switch device 101 relays an Ethernet frame transmitted between the automated driving ECU 111A and the sensor 111B.

Also, the switch device 101 can also function as a layer 3 (L3) relay device, and relays Ethernet frames between the functional units 111 belonging to different subnets.

In this example, the switch device 101 relays an Ethernet frame transmitted between the automated driving ECU 111A and the navigation device 111C and an Ethernet frame transmitted between the sensor 111B and the navigation device 111C.

More specifically, for example, the sensor 111B, periodically senses an object in the vicinity of its own vehicle 1 of, generates an IP packet including sensor information indicating a sensing result, and stores the IP packet in the Ethernet frame.

The IP packet includes, for example, an IP address of the sensor 111B and an IP address of the automated driving ECU 111A as a transmission source IP address and a transmission destination IP address.

Since the sensor 111B belongs to the same subnet as the automated driving ECU 111A, the sensor 111B writes a media access control (MAC) address of the automated driving ECU 111A and its own MAC address in the Ethernet frame as the transmission destination MAC address and the transmission source MAC address, respectively.

The sensor 111B transmits an Ethernet frame storing an IP packet including the sensor information to the switch device 101.

Upon receiving the Ethernet frame from the sensor 111B, the switch device 101 performs a layer 2 switching process on the received Ethernet frame and transmits the Ethernet frame to the automated driving ECU 111A.

For example, the automated driving ECU 111A acquires the sensor information from the Ethernet frame received from the sensor 111B via the switch device 101, and controls an operation of its own vehicle 1 on the basis of the acquired sensor information.

Further, for example, the automated driving ECU 111A periodically transmits situation information indicating a situation of the automated driving of its own vehicle 1 to the navigation device 111C.

More specifically, for example, the automated driving ECU 111A generates an IP packet including the situation information and stores the IP packet in the Ethernet frame.

The IP packet includes, for example, an IP address of the automated driving ECU 111A and an IP address of the navigation device 111C as the transmission source IP address and the transmission destination IP address.

Since the automated driving ECU 111A belongs to a subnet different from the navigation device 111C, the automated driving ECU 111A writes the MAC address of the switch device 101 which is a default gateway and its own MAC address in the Ethernet frame as the transmission destination MAC address and the transmission source MAC address.

The automated driving ECU 111A transmits an Ethernet frame storing an IP packet including status information to the switch device 101.

Upon receiving the Ethernet frame from the automated driving ECU 111A, the switch device 101 performs a layer 3 relay process on the received Ethernet frame and transmits the Ethernet frame to the navigation device 111C.

For example, the navigation device 111C acquires the situation information from the Ethernet frame received from the automated driving ECU 111A via the switch device 101, and displays the situation of the automated driving of the vehicle 1 indicated by the acquired situation information on a display device to notify a driver of the situation.

Figure 3:
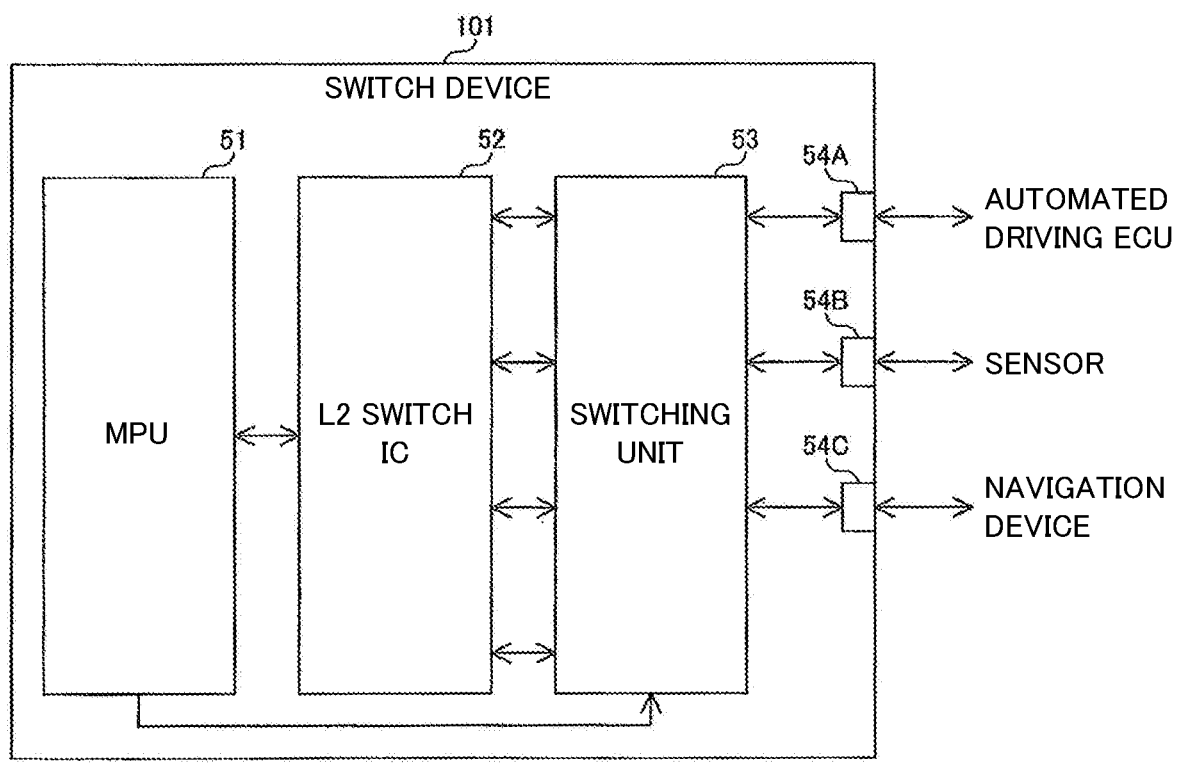
FIG. 3 is a diagram illustrating a configuration of a switch device in the in-vehicle communication system according to the first embodiment of the present disclosure.

FIG. 3 is a diagram illustrating a configuration of the switch device in the in-vehicle communication system according to the first embodiment of the present disclosure.

Referring to FIG. 3, the switch device 101 includes a micro processing unit (MPU) (control unit) 51, an L2 switch integrated circuit (IC) 52, a switching unit 53, and communication ports (first communication ports) 54A, 54B, and 54C.

Hereinafter, each of the communication ports 54A, 54B, and 54C is also referred to as a communication port 54. The communication port 54 is, for example, a terminal to which an Ethernet cable can be connected.

Incidentally, the switch device 101 is not limited to the configuration in which the three communication ports 54 are disposed, but may have a configuration in which two or four or more communication ports 54 are disposed.

A plurality of communication ports 54 can be connected to a plurality of functional units in the vehicle 1, respectively. In this example, the communication ports 54A, 54B, and 54C are connected to the automated driving ECU 111A, the sensor 111B, and the navigation device 111C via the Ethernet cables, respectively.

Figure 4:
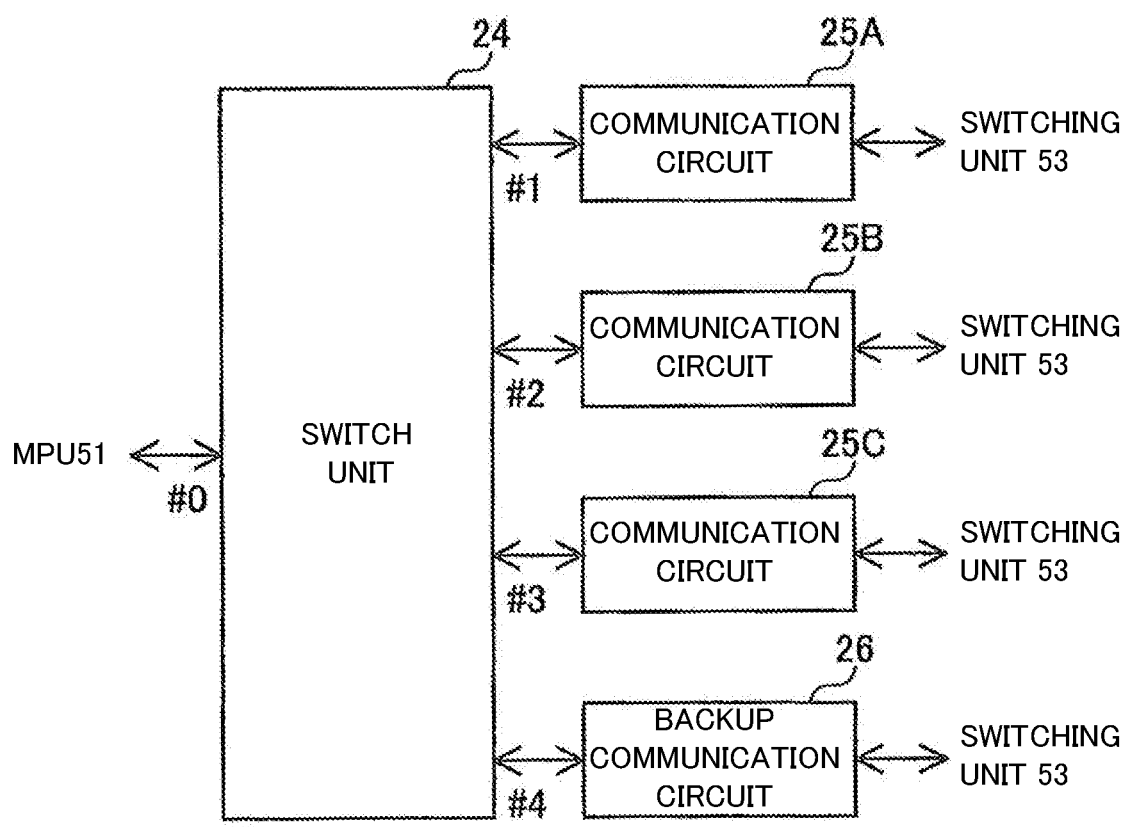
FIG. 4 is a diagram illustrating a configuration of an L2 switch IC in the switch device according to the first embodiment of the present disclosure.

FIG. 4 is a diagram illustrating the configuration of the L2 switch IC in the switch device according to the first embodiment of the present disclosure.

Referring to FIG. 4, the L2 switch IC 52 includes a switch unit 24, communication circuits (first communication circuits) 25A, 25B, and 25C, and a backup communication circuit (second communication circuit) 26. Hereinafter, each of the communication circuits 25A, 25B, and 25C is also referred to as a communication circuit 25.

Figure 5:
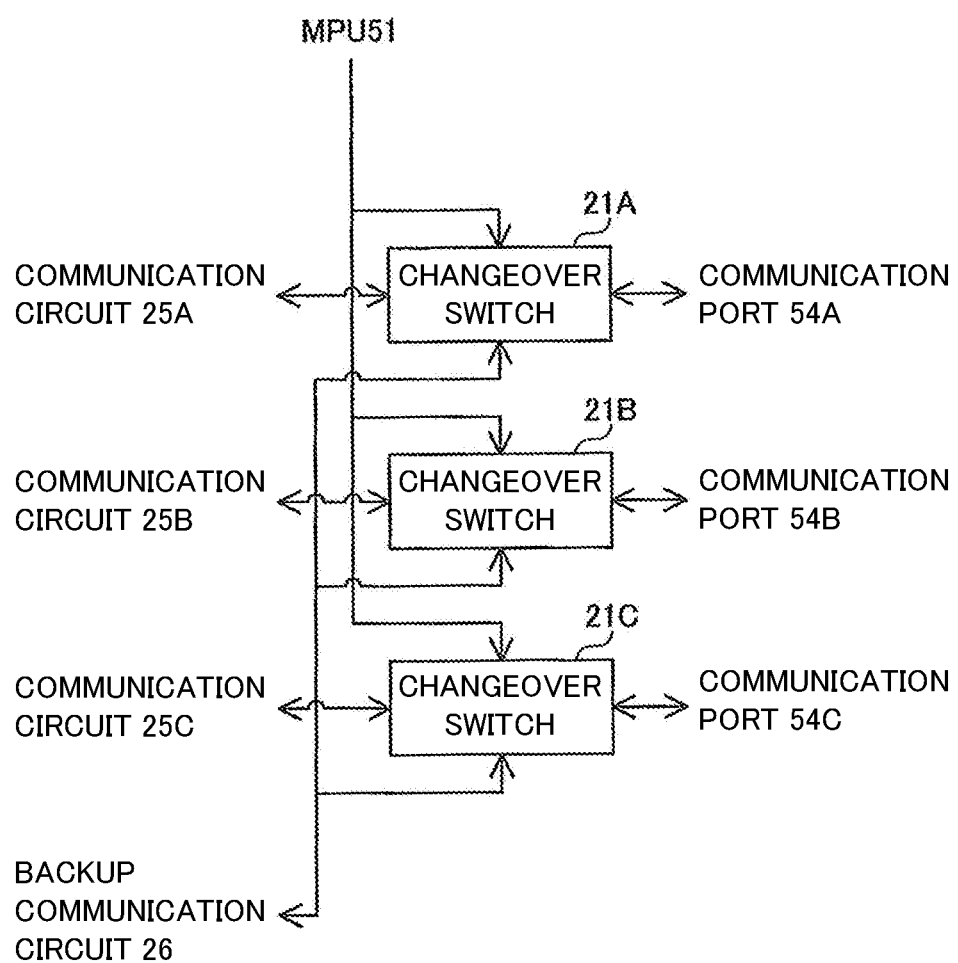
FIG. 5 is a diagram illustrating a configuration of a switching unit in the switch device according to the first embodiment of the present disclosure.

FIG. 5 is a diagram illustrating the configuration of the switching unit in the switch device according to the first embodiment of the present disclosure.

Referring to FIG. 5, the switching unit 53 includes changeover switches 21A, 21B, and 21C. Hereinafter, each of the changeover switches 21A, 21B, and 21C is also referred to as a changeover switch 21.

Referring to FIGS. 3 to 5, a plurality of communication circuits 25 are disposed corresponding to a plurality of communication ports 54, respectively.

More specifically, the communication circuits 25A, 25B, and 25C in the L2 switch IC 52 are disposed corresponding to the changeover switches 21A, 21B, and 21C in the switching unit 53, respectively.

The changeover switches 21A, 21B, and 21C are disposed corresponding to the communication ports 54A, 54B, and 54C, respectively.

The switching unit 53 can switch a connection destination of each communication port 54 between the corresponding communication circuit 25 and the backup communication circuit 26.

More specifically, the changeover switch 21 in the switching unit 53 can switch the connection destination of the communication port 54 connected to itself to the communication circuit 25 corresponding to the communication port 54 or the backup communication circuit 26 in accordance with the control of the MPU 51.

Figures 6, 7:
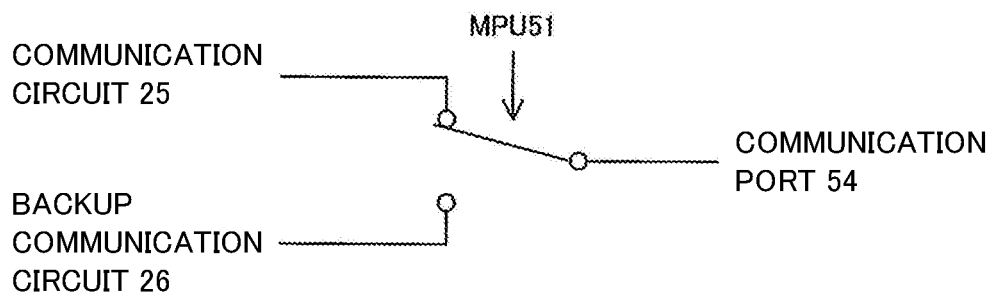
FIG. 6 is a diagram illustrating a configuration of a changeover switch in the switching unit according to the first embodiment of the present disclosure.
FIG. 7 is a diagram illustrating an example of an ARL table held in the switch unit in the switch device according to the first embodiment of the present disclosure.

FIG. 6 is a diagram illustrating a configuration of the changeover switch in the switching unit according to the first embodiment of the present disclosure.

Referring to FIG. 6, the changeover switch 21 includes a first end connected to the communication port 54, a second end connected to the communication circuit 25, and a third end connected to the backup communication circuit 26.

Upon receiving a normal connection command from the MPU 51, the changeover switch 21 electrically connects the first end with the second end.

On the other hand, upon receiving a redundant connection command from the MPU 51, the changeover switch 21 electrically connects the first end with the third end.

Hereinafter, in the changeover switch 21, a state in which the first end and the second end are electrically connected is also referred to as a normal connection state. Also, a state in which the first end and the third end are electrically connected is also referred to as a redundant connection state.

Referring back to FIGS. 3 to 5, the communication circuit 25 can communicate with the functional unit 111 via the corresponding communication port.

In a case in which the communication circuits 25A, 25B, and 25C are operating normally, the changeover switches 21A, 21B, and 21C are set to the normal connection state by the MPU 51. In this case, the communication circuits 25A, 25B, and 25C can communicate with the automated driving ECU 111A, the sensor 111B, and the navigation device 111C via the communication ports 54A, 54B, and 54C, respectively.

The backup communication circuit 26 can communicate with the functional unit 111 via the communication port 54. More specifically, for example, when the operation of the communication circuit 25A is abnormal, the changeover switch 21A is set to the redundant connection state by the MPU 51. In this case, the backup communication circuit 26 can communicate with the automated driving ECU 111A via the communication port 54A.

Similarly, when the changeover switch 21B is set to the redundant connection state by the MPU 51, the backup communication circuit 26 can communicate with the sensor 111B via the communication port 54B. Further, when the changeover switch 21C is set to the redundant connection state by the MPU 51, the backup communication circuit 26 can communicate with the navigation device 111C via the communication port 54C.

The operations of the MPU 51 and the L2 switch IC 52 when the changeover switches 21A to 21C are set to the normal connection state will be described with reference to FIGS. 3 and 4.

Upon receiving an electric signal from the functional unit 111 connected via, for example, the corresponding changeover switch 21 and the communication port 54, the communication circuit 25 in the L2 switch IC 52 generates a symbol sequence by demodulating the electric signal in accordance with a predetermined modulation scheme, and converts the generated symbol sequence into a bit string. Here, the converted bit string indicates the Ethernet frame.

The communication circuit 25 performs cyclic redundancy check (CRC) check, a filtering process, and the like, on the generated bit string, that is, the Ethernet frame, and then outputs the Ethernet frame to the switch unit 24.

Also, upon receiving the Ethernet frame from the switch unit 24, the communication circuit 25 converts the bit string indicating the received Ethernet frame into a symbol sequence in accordance with a predetermined modulation scheme.

The communication circuit 25 generates an electrical signal by modulating a carrier wave in accordance with the converted symbol in order from the first symbol in the converted symbol sequence, and transmits the generated electrical signal to the functional unit 111 connected via the corresponding changeover switch 21 and communication port 54.

Also, the backup communication circuit 26 operates similarly to the communication circuit 25 when communicating with the functional unit 111 via any one of the changeover switches 21A, 21B, and 21C.

[Layer 2 Switch Process]

FIG. 7 is a diagram illustrating an example of an ARL table held in the switch unit in the switch device according to the first embodiment of the present disclosure.

Referring to FIGS. 4 and 7, the switch unit 24 performs a layer 2 switch process. More specifically, for example, the switch unit 24 includes a plurality of terminals connected to the communication circuits 25A, 25B, and 25C, the backup communication circuit 26, and the MPU 51, respectively. Each terminal is assigned a unique logical port number.

In this example, the logical port numbers of the terminals connected to the MPU 51, the communication circuit 25A, the communication circuit 25B, the communication circuit 25C, and the backup communication circuit 26 are #0, #1, #2, #3, and #4, respectively.

Hereinafter, the terminals which are assigned the logical port numbers #1, #2, and #3 are also referred to as normal terminals. Further, the terminal which is assigned the logical port number #4 is also referred to as a first backup terminal.

Further, the switch unit 24 holds, for example, an address resolution logic (ARL) table illustrated in FIG. 7.

For example, content of the ARL table is decided by a user in advance on the basis of the connection relation fixed in the in-vehicle network 12 as described above.

The ARL table indicates a correspondence relation between a transmission destination MAC address and an output destination. Here, the output destination is the logical port number.

Specifically, the ARL table includes a correspondence relation between the MAC address of the functional unit 111 and the terminal having the functional unit 111 as the connection destination, that is, the logical port number of the normal terminal and a correspondence relation between the MAC address of its own switch device 101 and the logical port number of the MPU 51.

Upon receiving the Ethernet frame from the communication circuit 25, the switch unit 24 refers to the transmission destination MAC address included in the received Ethernet frame.

The switch unit 24 acquires the output destination corresponding to the referred transmission destination MAC address from the ARL table, and outputs the received Ethernet frame to the acquired output destination.

Specifically, for example, the switch unit 24 acquires any one among #1 to #3 as the logical port number corresponding to the referred transmission destination MAC address for the Ethernet frame transmitted within the same subnet such as the Ethernet frame transmitted from the sensor 111B to the automated driving ECU 111A.

Then, the switch unit 24 transmits the Ethernet frame received from the communication circuit 25 from the terminal of the acquired logical port number to the functional unit 111 via another communication circuit 25, the changeover switch 21, and the communication port 54.

On the other hand, for example, the switch unit 24 acquires #0 as the logical port number corresponding to the referred transmission destination MAC address for the Ethernet frame transmitted between different subnets such as the Ethernet frame transmitted from the automated driving ECU 111A to the navigation device 111C.

Then, the switch unit 24 outputs the Ethernet frame received from the communication circuit 25 to the MPU 51.

Also, upon receiving the Ethernet frame from the MPU 51, the switch unit 24 refers to the transmission destination MAC address included in the received Ethernet frame.

The switch unit 24 acquires the output destination corresponding to the referred transmission destination MAC address from the ARL table, and outputs the Ethernet frame received from the MPU 51 to the acquired output destination.

[Layer 3 Relay Process] Referring back to FIG. 3, the MPU 51 performs a layer 3 relay process. More specifically, upon receiving the Ethernet frame from the L2 switch IC 52, the MPU 51 performs the L3 relay process of rewriting the transmission destination MAC address and the transmission source MAC address of the received Ethernet frame.

More specifically, for example, the MPU 51 holds a routing table indicating a correspondence relation between the transmission destination network and a transmission interface. Further, for example, the MPU 51 holds an address resolution protocol (ARP) table indicating a correspondence relation between an IP address and a MAC address for each transmission interface.

Upon receiving the Ethernet frame from the L2 switch IC 52, the MPU 51 acquires the transmission destination IP address from the IP packet included in the received Ethernet frame, for example, performs a subnet mask calculation on the acquired transmission destination IP address, and specifies the transmission destination network.

The MPU 51 specifies the transmission interface corresponding to the specified transmission destination network with reference to the routing table.

Then, the MPU 51 acquires the MAC address corresponding to the transmission destination IP address from the ARP table with reference to the ARP table corresponding to the specified transmission interface.

The MPU 51 rewrites the transmission destination MAC address and the transmission source MAC address of the Ethernet frame with the acquired MAC address and the MAC address of its own switch device 101, and outputs the rewritten Ethernet frame to the L2 switch IC 52.

[Control of Switching Unit 53]

Referring to FIGS. 3 and 4, the MPU 51 controls the switching unit 53 such that a connection destination of a target port which is a target communication port 54 is switched to the backup communication circuit 26 when a predetermined condition C1 is satisfied.

Here, for example, the predetermined condition C1 is a condition that an abnormality occurs in the communication circuit 25. Also, for example, the target port is the communication port 54 corresponding to the communication circuit 25 in which the abnormality occurs.

More specifically, for example, the MPU 51 monitors the communication state in each normal terminal in the switch unit 24 of the L2 switch IC 52, and detects an abnormality in communication in the switch unit 24 on the basis of the monitoring result.

Specifically, for example, the MPU 51 performs failure detection and intrusion detection in each normal terminal.

Here, for example, the failure detection is detecting a physical failure such as a failure that no signal is received in at least one of the normal terminals.

For example, the intrusion detection is detecting a logical abnormality in at least one of the normal terminals such as an abnormality in which the communication rate is abnormally large or an abnormality in which a count value of a reception counter is abnormally large due to unauthorized access such as denial of service (DoS) attack.

For example, when the abnormality in communication is detected in the terminal of the logical port number #3, the MPU 51 performs the following process.

That is, for example, the MPU 51 outputs the redundant connection command to the changeover switch 21C in the switching unit 53 (see FIG. 5), and causes the changeover switch 21C to transition from the normal connection state to the redundant connection state.

With such a configuration, the Ethernet frame transmitted from the navigation device 111C is received in the switch unit 24 via the communication port 54C, the changeover switch 21C, and the backup communication circuit 26.

The MPU 51 checks the communication state in the terminal of the logical port number #4, that is, the first backup terminal. Specifically, the MPU 51 confirms, for example, whether or not normal link-up and normal transmission/reception of the Ethernet frame are performed.

In a case in which the communication state in the first backup terminal is checked to be normal, for example, the MPU 51 rewrites the output destination corresponding to the MAC address of the navigation device 111C from #3 to #4 in the ARL table (see FIG. 7).

With such a configuration, the Ethernet frame having the MAC address of the navigation device 111C as the transmission destination MAC address is transmitted from the switch unit 24 to the navigation device 111C via the backup communication circuit 26, the changeover switch 21C, and the communication port 54C.

On the other hand, when the communication state in the first backup terminal is checked not to be normal, the MPU 51 recognizes that the redundant switching has failed, and records information indicating that the redundant switching has failed in, for example, an error log.

[Flow of Operation]

The switch device includes a computer, and an operation processing unit such as a CPU in the computer reads a program including some or all of steps in the following flowchart from a memory (not illustrated) and executes the program. The program of this device can be installed from the outside. The program of this device is distributed in a state in which it is stored in a recording medium.

Figure 8:
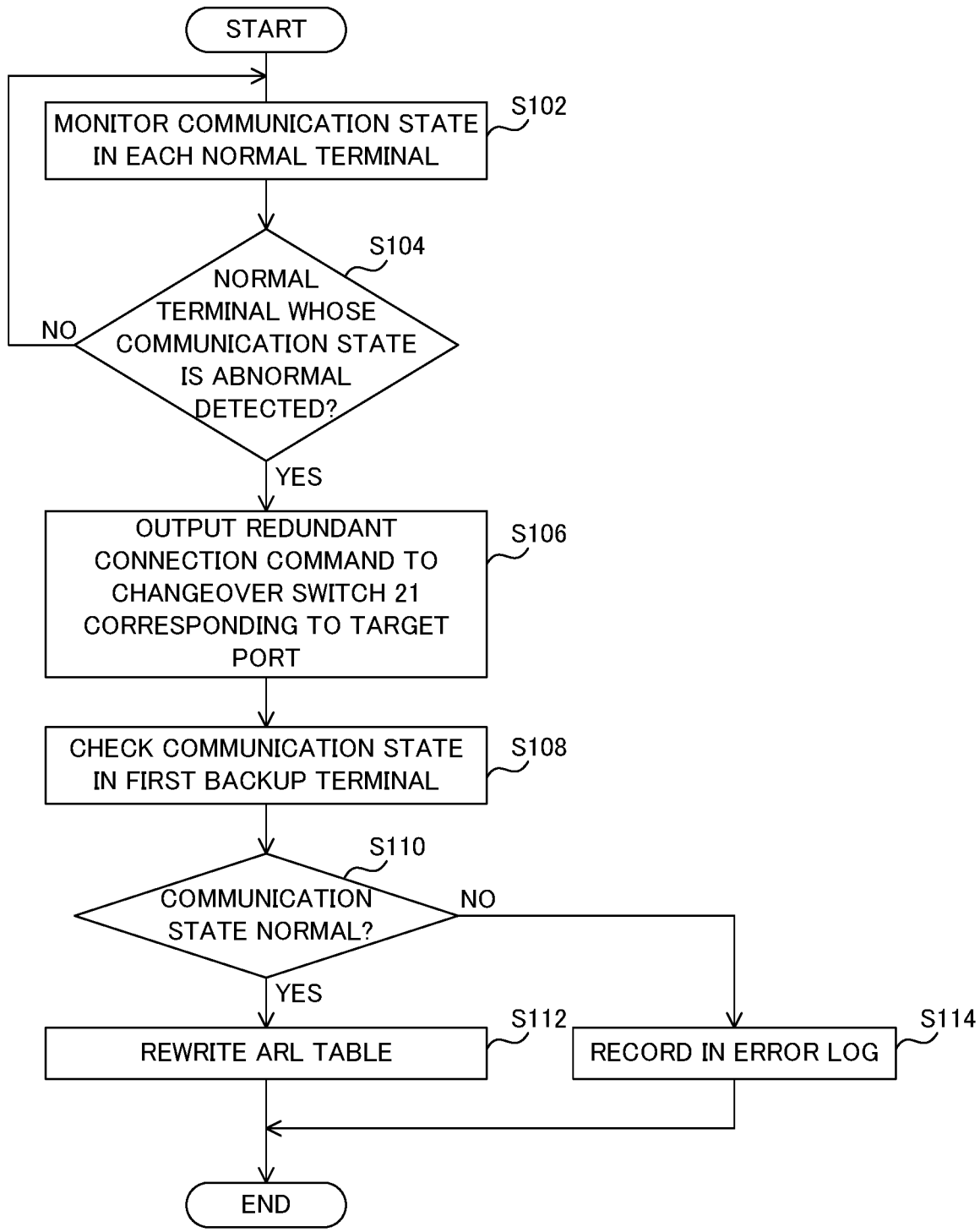
FIG. 8 is a flowchart illustrating an operation procedure when the switch device in the in-vehicle communication system according to the first embodiment of the present disclosure performs a redundant switching process.

FIG. 8 is a flowchart illustrating an operation procedure when the switch device in the in-vehicle communication system according to the first embodiment of the present disclosure performs a redundant switching process.

Referring to FIG. 8, first, the MPU 51 in the switch device 101 monitors the communication state in each normal terminal (step S102) until the normal terminal whose communication state is abnormal is detected (NO in step S104).

Then, when the normal terminal whose communication state is abnormal is detected (YES in step S104), the MPU 51 outputs the redundant connection command to the changeover switch 21 corresponding to the normal terminal in which the abnormality is detected, that is, the changeover switch 21 corresponding to the target port (step S106).

Then, the MPU 51 checks the communication state in the first backup terminal (step S108).

Then, when the checked communication state is normal (YES in step S110), the MPU 51 rewrites the logical port number of the normal terminal in which the abnormality is detected with the logical port number of the first backup terminal in the ARL table (step S112).

On the other hand, when the checked communication state is abnormal (NO in step S110), the MPU 51 records information indicating that the redundant switching has failed in an error log (step S114).

Incidentally, for example, when relay of a virtual local area network (VLAN) is performed in the switch device 101, in above step S112, the MPU 51 may rewrite a VALN table together with the ARL table.

Further, in the switch device according to the first embodiment of the present disclosure, the predetermined condition C1 is the occurrence of an abnormality in the communication circuit 25, but the present disclosure is not limited to this example. The predetermined condition C1 may be any other condition such as, for example, a condition that the communication circuit is unable to be used temporarily due to the maintenance of the communication circuit, or the like or a condition that the usage time of the communication circuit exceeds a predetermined useful life.

By the way, in the vehicle in which a plurality of functional units are disposed, there are cases in which the switch device that relays data which is transmitted and received between the functional units is disposed. In a case in which a communication circuit for communicating with a functional unit is unable to be used in the switch device, communication between the switch device and the functional unit is disconnected, and transmission and reception of data between the functional units is not performed normally. A technique capable of achieving a more stable operation of the switch device is desired due to system redundancy, but such redundancy is not disclosed in Japanese Patent Laid-Open Publication No. 2016-12932.

On the other hand, the switch device according to the first embodiment of the present disclosure relays data in the in-vehicle network 12 and includes a plurality of communication ports 54 connectable to a plurality of functional units 111 in the vehicle 1. A plurality of communication circuits 25 are disposed corresponding to a plurality of communication ports 54 and can communicate with the functional units 111 via the corresponding communication ports 54. One backup communication circuit 26 is disposed in the switch device 101. The switching unit 53 can switch the connection destination of each communication port 54 between the corresponding communication circuit 25 and the backup communication circuit 26. Then, when the predetermined condition C1 is satisfied, the MPU 51 controls the switching unit 53 such that the connection destination of the target port which is the target communication port 54 is switched to the backup communication circuit 26.

With such a configuration, when the predetermined condition C1 such that a condition that the communication circuit 25 is unable to be used is satisfied, the connection destination of the communication port 54 corresponding to the communication circuit 25 is switched to the backup communication circuit 26, and the functional unit 111 connected to the corresponding communication circuit 25, that is, the target port can communicate with the backup communication circuit 26 via the target port, so that the appropriate redundancy of the communication circuit 25 can be realized. Accordingly, since the functional unit 111 can continue communication with the switch device 101, it is possible to prevent transmission and reception of data between the functional unit 111 and other functional units 111 from being not normally performed. Therefore, the more stable operation of the switch device that relays data can be realized in the in-vehicle network.

Further, in the switch device according to the first embodiment of the present disclosure, the predetermined condition C 1 is the occurrence of an abnormality in the communication circuit 25. Further, the target port is the communication port 54 corresponding to the communication circuit 25 in which the abnormality occurs.

With such a configuration, even when an abnormality occurs in the communication circuit 25, and the communication circuit 25 is unable to be used, the functional unit 111 connected to the communication port 54 corresponding to the communication circuit 25, that is, the target port can communicate with the backup communication circuit 26 via the target port and can thus continue the communication with the switch device 101.

Next, another embodiment of the present disclosure will be described with reference to the appended drawings. Incidentally, in the drawings, the same or corresponding parts are designated by the same reference numerals, and description thereof will not be repeated.

Second Embodiment

The present embodiment relates to a switch device including a plurality of backup communication circuits as compared with the switch device according to the first embodiment. Except the content described below, it is similar to the switch device according to the first embodiment.

Figure 9:
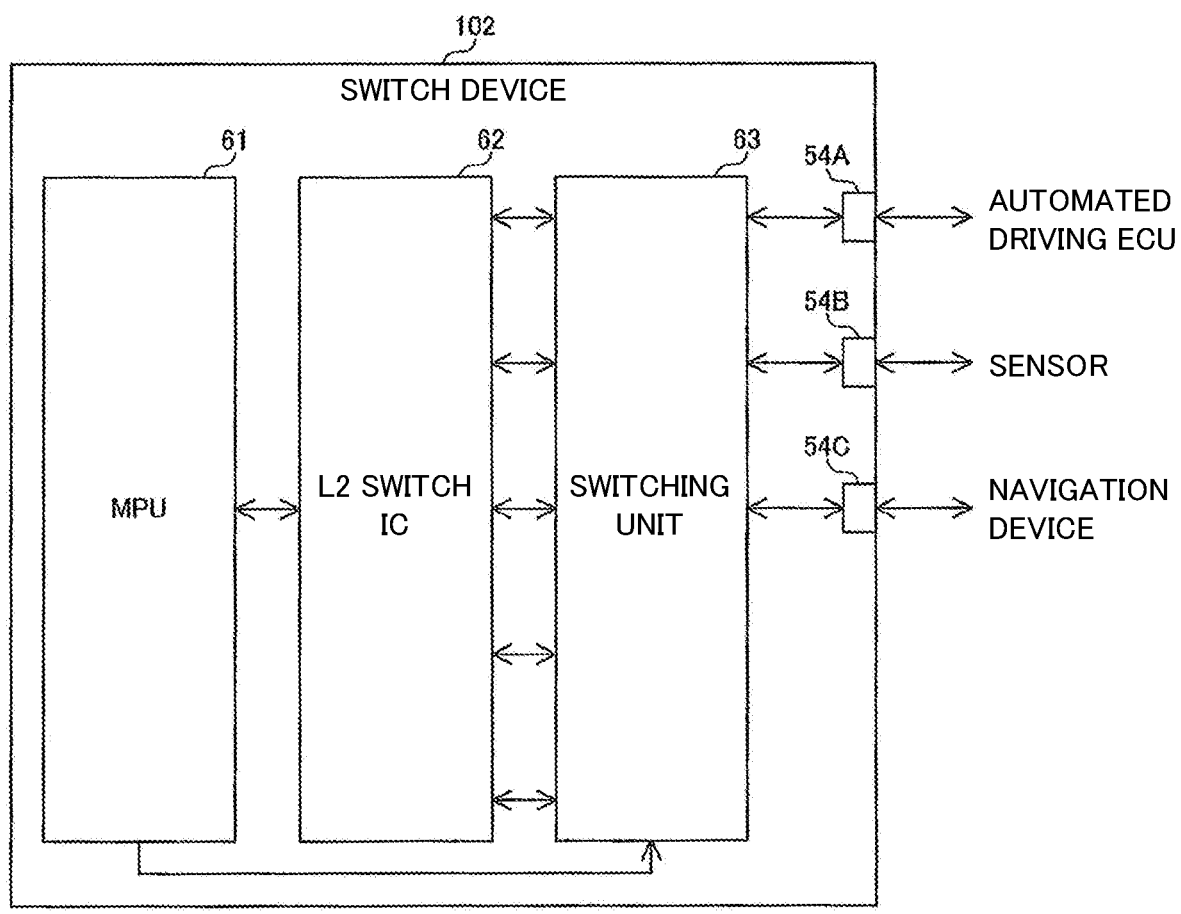
FIG. 9 is a diagram illustrating a configuration of a switch device in an in-vehicle communication system according to a second embodiment of the present disclosure.

FIG. 9 is a diagram illustrating a configuration of a switch device in an in-vehicle communication system according to the second embodiment of the present disclosure.

Referring to FIG. 9, a switch device 102 includes an MPU (control unit) 61, an L2 switch IC 62, a switching unit 63, and communication ports (first communication ports) 54A, 54B, and 54C.

The operations of the communication ports 54A, 54B, and 54C in the switch device 102 are similar to those of the communication ports 54A, 54B, and 54C in the switch device 101 illustrated in FIG. 3.

Figure 10:
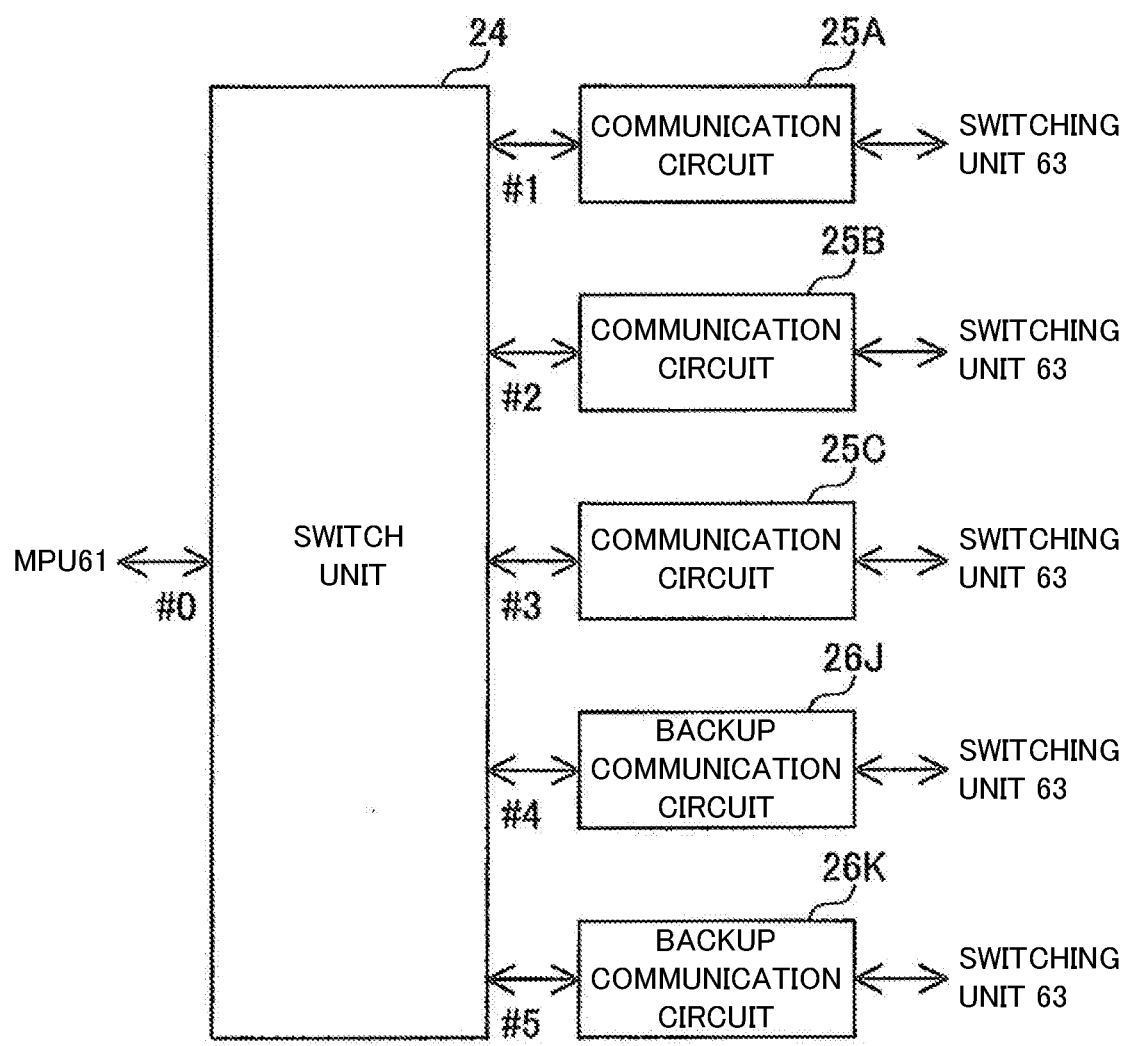
FIG. 10 is a diagram illustrating a configuration of an L2 switch IC in the switch device according to the second embodiment of the present disclosure.

FIG. 10 is a diagram illustrating a configuration of the L2 switch IC in the switch device according to the second embodiment of the present disclosure.

Referring to FIG. 10, the L2 switch IC 62 includes a switch unit 24, communication circuits 25A, 25B, and 25C, and backup communication circuits 26J and 26K serving as the backup communication circuit 26.

The operations of the switch unit 24, the communication circuit 25 and the backup communication circuit 26 in the L2 switch IC 62 are similar to those of the switch unit 24, the communication circuit 25, and the backup communication circuit 26 in the L2 switch IC 52 illustrated in FIG. 4.

Incidentally, the switch device 102 is not limited to the configuration in which the two backup communication circuits 26 are disposed and may have a configuration in which three or more backup communication circuits 26 are disposed.

In this example, the logical port numbers of the terminals connected to the MPU 61, the communication circuit 25A, the communication circuit 25B, the communication circuit 25C, the backup communication circuit 26J, and the backup communication circuit 26K are #0, #1, #2, #3, #4, and #5, respectively. Hereinafter, a terminal to which the logical port number #5 is assigned is also referred to as a second backup terminal.

Figure 11:
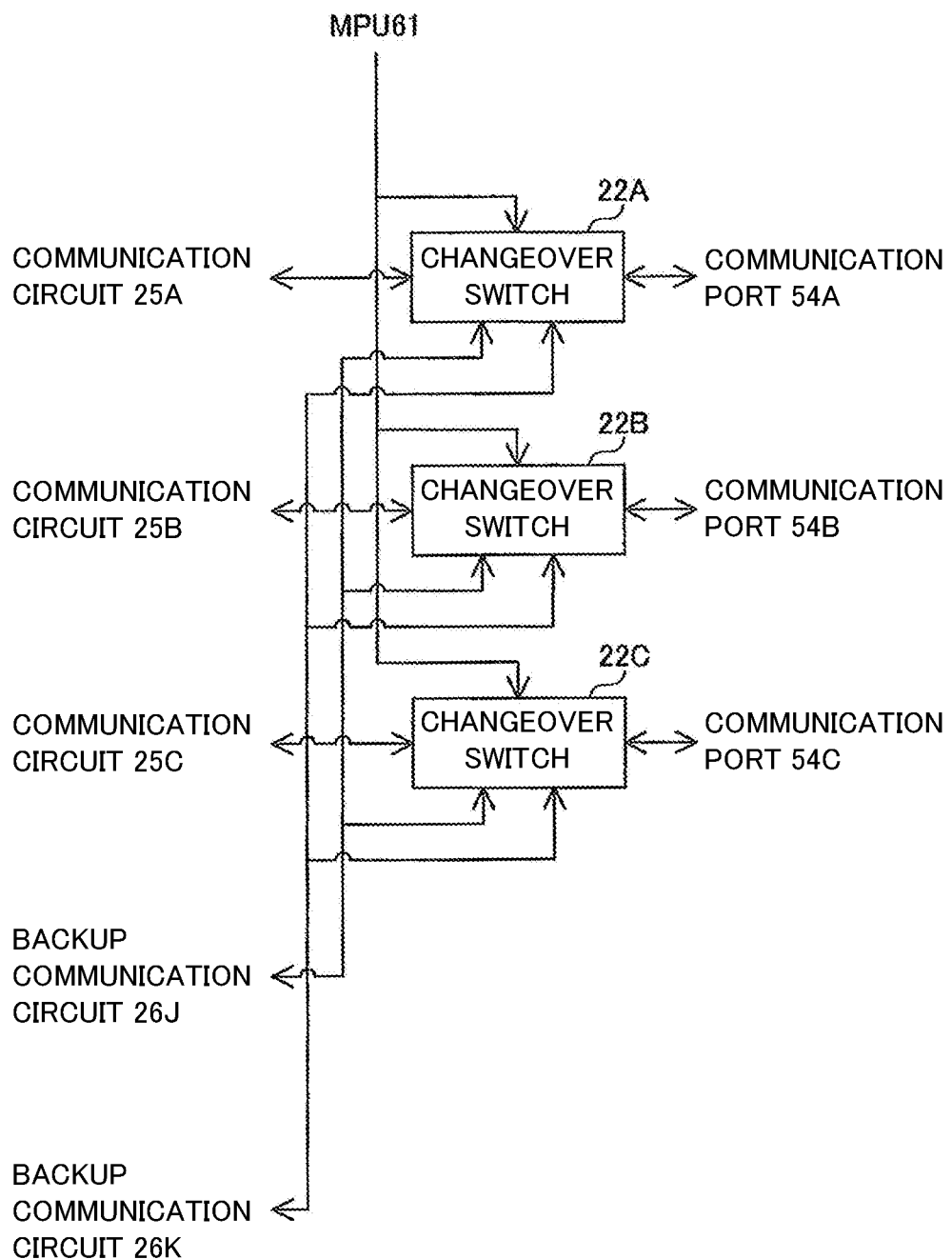
FIG. 11 is a diagram illustrating a configuration of a switching unit in the switch device according to the second embodiment of the present disclosure.

FIG. 11 is a diagram illustrating a configuration of the switching unit in the switch device according to the second embodiment of the present disclosure.

Referring to FIG. 11, the switching unit 63 includes changeover switches 22A, 22B, and 22C. Hereinafter, each of the changeover switches 22A, 22B, and 22C is also referred to as a changeover switch 22.

Referring to FIGS. 9 to 11, the communication circuits 25A, 25B, and 25C in the L2 switch IC 62 are disposed corresponding to the changeover switches 22A, 22B, and 22C in the switching unit 63, respectively.

The changeover switches 22A, 22B, and 22C are disposed corresponding to the communication ports 54A, 54B, and 54C, respectively.

The switching unit 63 can switch the connection destination of each communication port 54 between the corresponding communication circuit 25 and a plurality of backup communication circuits 26.

More specifically, the changeover switch 22 in the switching unit 63 can switch the connection destination of the communication port 54 connected to itself to the communication circuit 25 corresponding to the communication port 54 or the backup communication circuits 26J and 26K in accordance with the control of the MPU 61.

Figure 12:
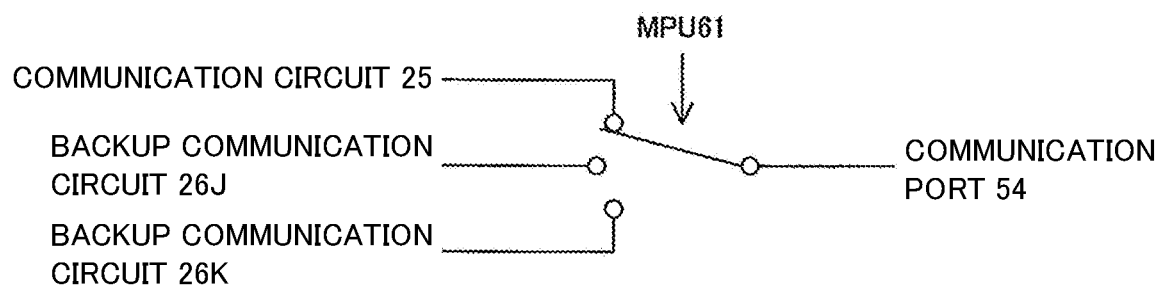
FIG. 12 is a diagram illustrating a configuration of a changeover switch in the switching unit according to the second embodiment of the present disclosure.

FIG. 12 is a diagram illustrating a configuration of the changeover switch in the switching unit according to the second embodiment of the present disclosure.

Referring to FIG. 12, the changeover switch 22 includes a first end connected to the communication port 54, a second end connected to the communication circuit 25, a third end connected to the backup communication circuit 26J, and a fourth end connected to the backup communication circuit 26K.

Upon receiving the normal connection command from the MPU 61, the changeover switch 22 electrically connects the first end with the second end.

On the other hand, upon receiving a first redundant connection command from the MPU 61, the changeover switch 22 electrically connects the first end with the third end.

Also, upon receiving a second redundant connection command from the MPU 61, the changeover switch 22 electrically connects the first end with the fourth end.

Hereinafter, in the changeover switch 22, a state in which the first end and the second end are electrically connected is also referred to as a normal connection state. A state in which the first end and the third end are electrically connected is also referred to as a first redundant connection state. Further, a state in which the first end and the fourth end are electrically connected is also referred to as a second redundant connection state.

FIG. 13 is a diagram illustrating an example of a changeover switch state table held in the MPU in the switch device according to the second embodiment of the present disclosure.

Referring to FIG. 13, the MPU 61 holds a changeover switch state table indicating a correspondence relation between the communication port 54 and the state of the corresponding changeover switch 22. In a case in which the communication circuits 25A, 25B, and 25C are operating normally, the changeover switches 22A to 22C are all in the normal connection state.

Referring back to FIG. 9, for example, when the connection destination of the target port is switched to the backup communication circuit 26, in a case in which the backup communication circuit 26 is already connected to another communication port 54, the MPU 61 determines which of the target port and another communication port 54 has to be connected to the backup communication circuit 26.

More specifically, the MPU 61 performs the above determination in accordance with, for example, a priority of each of a plurality of communication ports 54.

FIG. 14 is a diagram illustrating an example of a priority table held in the MPU in the switch device according to the second embodiment of the present disclosure.

Referring to FIG. 14, the MPU 61 holds a priority table indicating a correspondence relation between the communication port 54 and a switching priority. In this example, the switching priorities of the communication ports 54A, 54B, and 54C are 3, 2, and 1 respectively. Here, as the value of the switching priority increases, the priority increases.

Therefore, the priority of the communication port 54A connected to the automated driving ECU 111A is highest, and the priority of the communication port 54C connected to the navigation device 111C is lowest.

[First Redundant Switching]

FIG. 15 is a diagram illustrating an example of a changeover switch state table held in the MPU in the switch device according to the second embodiment of the present disclosure.

FIG. 16 is a diagram illustrating an example of an ARL table held in the switch unit in the switch device according to the second embodiment of the present disclosure.

A situation in which the communication circuits 25A, 25B, and 25C are operating normally is assumed with reference to FIGS. 9 to 11 and FIGS. 15, and 16. In this situation, the switch unit 24 holds the ARL table illustrated in FIG. 7.

The MPU 61 performs failure detection and intrusion detection in each normal terminal. For example, when an abnormality in communication in the terminal of the logical port number #1 is detected, the MPU 61 performs the following process.

That is, the MPU 61 checks that both of the backup communication circuits 26J and 26K are not in use with reference to, for example, the changeover switch state table illustrated in FIG. 13.

Then, for example, the MPU 61 outputs the first redundant connection command to the changeover switch 22A in the switching unit 63, and causes the changeover switch 22A to transition from the normal connection state to the first redundant connection state.

Accordingly, an electrical connection between the communication circuit 25A and the communication port 54A is disconnected, and the backup communication circuit 26J and the communication port 54A are electrically connected.

Further, as illustrated in FIG. 15, the MPU 61 rewrites the "state of the corresponding changeover switch" corresponding to the "communication port 54A" with the "first redundant connection state".

The MPU 61 checks the communication state in the terminal of the logical port number #4, that is, the communication state in the first backup terminal, and rewrites the output destination corresponding to the MAC address of the automated driving ECU 111A from #1 to #4 when the communication state in the first backup terminal is checked to be normal as illustrated in FIGS. 7 and 16.

Incidentally, the configuration of the MPU 61 is not limited to the configuration of checking whether or not the backup communication circuits 26J and 26K are used on the basis of the changeover switch state table, but the MPU 61 may be configured to check whether or not the backup communication circuits 26J and 26K are used by directly checking the states of the backup communication circuits 26J and 26K.

[Second Redundant Switching]

FIG. 17 is a diagram illustrating an example of a changeover switch state table held in the MPU in the switch device according to the second embodiment of the present disclosure.

FIG. 18 is a diagram illustrating an example of an ARL table held in the switch unit in the switch device according to the second embodiment of the present disclosure.

Referring to FIGS. 9 to 11 and FIGS. 17 and 18, for example, the MPU 61 performs the failure detection and the intrusion detection in the terminal of the logical port number #2 and the terminal of the logical port number #3.

For example, when an abnormality in communication in the terminal of the logical port number #3 is detected, the MPU 61 performs the following process.

That is, the MPU 61 checks that the backup communication circuit 26K is not in use with reference to, for example, the changeover switch state table illustrated in FIG. 15.

Then, for example, the MPU 61 outputs the second redundant connection command to the changeover switch 22C in the switching unit 63, and causes the changeover switch 22C to transition from the normal connection state to the second redundant connection state.

Accordingly, the electrical connection between the communication circuit 25C and the communication port 54C is disconnected, and the backup communication circuit 26K and the communication port 54C are electrically connected.

Further, as illustrated in FIG. 17, the MPU 61 rewrites the "state of the corresponding changeover switch" corresponding to the "communication port 54C" with the "second redundant connection state".

The MPU 61 checks the communication state in the terminal of the logical port number #5, that is, the communication state in the second backup terminal, and rewrites the output destination corresponding to the MAC address of the navigation device 111C from #3 to #5 when the communication state in the second backup terminal is checked to be normal as illustrated in FIGS. 16 and 18.

[Third Redundant Switching]

FIG. 19 is a diagram illustrating an example of a changeover switch state table held in the MPU in the switch device according to the second embodiment of the present disclosure.

FIG. 20 is a diagram illustrating an example of an ARL table held in the switch unit in the switch device according to the second embodiment of the present disclosure.

Referring to FIGS. 9 to 11 and FIGS. 19 and 20, for example, the MPU 61 can switch the connection destination of backup communication circuit 26 to another communication port 54 in a state in which the backup communication circuit 26 is connected to the communication port 54.

More specifically, for example, the MPU 61 performs the failure detection and the intrusion detection in the terminal of the logical port number #2.

For example, when an abnormality in communication in the terminal of the logical port number #2 is detected, the MPU 61 performs the following process.

That is, the MPU 61 checks that both of the backup communication circuits 26J and 26K are in use with reference to, for example, the changeover switch state table illustrated in FIG. 17.

Then, for example, the MPU 61 compares the switching priority of the target port with the switching priority of the communication port 54 electrically connected to the backup communication circuit 26. Here, the target port is the communication port 54 corresponding to the terminal of the logical port number #2, that is, the communication port 54B.

The MPU 61 checks that the communication ports 54 electrically connected to the backup communication circuits 26J and 26K are the communication ports 54A and 54C, respectively, with reference to the changeover switch state table illustrated in FIG. 17.

The MPU 61 recognizes that the target port with the switching priority of 2 is higher in priority than the communication port 54C and lower in priority than the communication port 54A with reference to the priority table illustrated in FIG. 14.

On the basis of the recognition result, the MPU 61 disconnects the electrical connection between the communication port 54C which is the communication port 54 with the priority lower than the target port (hereinafter also referred to as low-priority communication port) and the backup communication circuit 26K, determines that the target port and the backup communication circuit 26 K have to be electrically connected, and performs a connection change process.

More specifically, the MPU 61 outputs the normal connection command to the changeover switch 22C in the switching unit 63, causes the changeover switch 22C to transition from the second redundant connection state to the normal connection state, and disconnects the electrical connection between the low-priority communication port, that is, the communication port 54C and the backup communication circuit 26K.

Also, the MPU 61 outputs the second redundant connection command to the changeover switch 22B in the switching unit 63, causes the changeover switch 22B to transition from the normal connection state to the second redundant connection state, and electrically connects the target port, that is, the communication port 54B with the backup communication circuit 26K.

Further, as illustrated in FIG. 19, the MPU 61 rewrites the "state of the corresponding changeover switch" corresponding to the "communication port 54C" which is the low-priority communication port with the "normal connection state", and rewrites the "state of the corresponding changeover switch" corresponding to the "communication port 54B" which is the target port with the "second redundant connection state".

As illustrated in FIGS. 18 and 20, the MPU 61 checks the communication state in the terminal of the logical port number #5, that is, the communication state in the second backup terminal, and when the communication state in the second backup terminal is checked to be normal, the MPU 61 rewrites the output destination corresponding to the MAC address of the sensor 111B from #2 to #5, and rewrites the output destination corresponding to the MAC address of the navigation device 111C from #5 to, for example, NULL.

In a case in which the layer 2 switch process is performed, when the output destination corresponding to the transmission destination MAC address included in the Ethernet frame to be output is NULL in the ARL table, the switch unit 24 recognizes that the output destination of the Ethernet frame does not exist, and, for example, discards the Ethernet frame.

[Flow of Operation]

Figure 21:
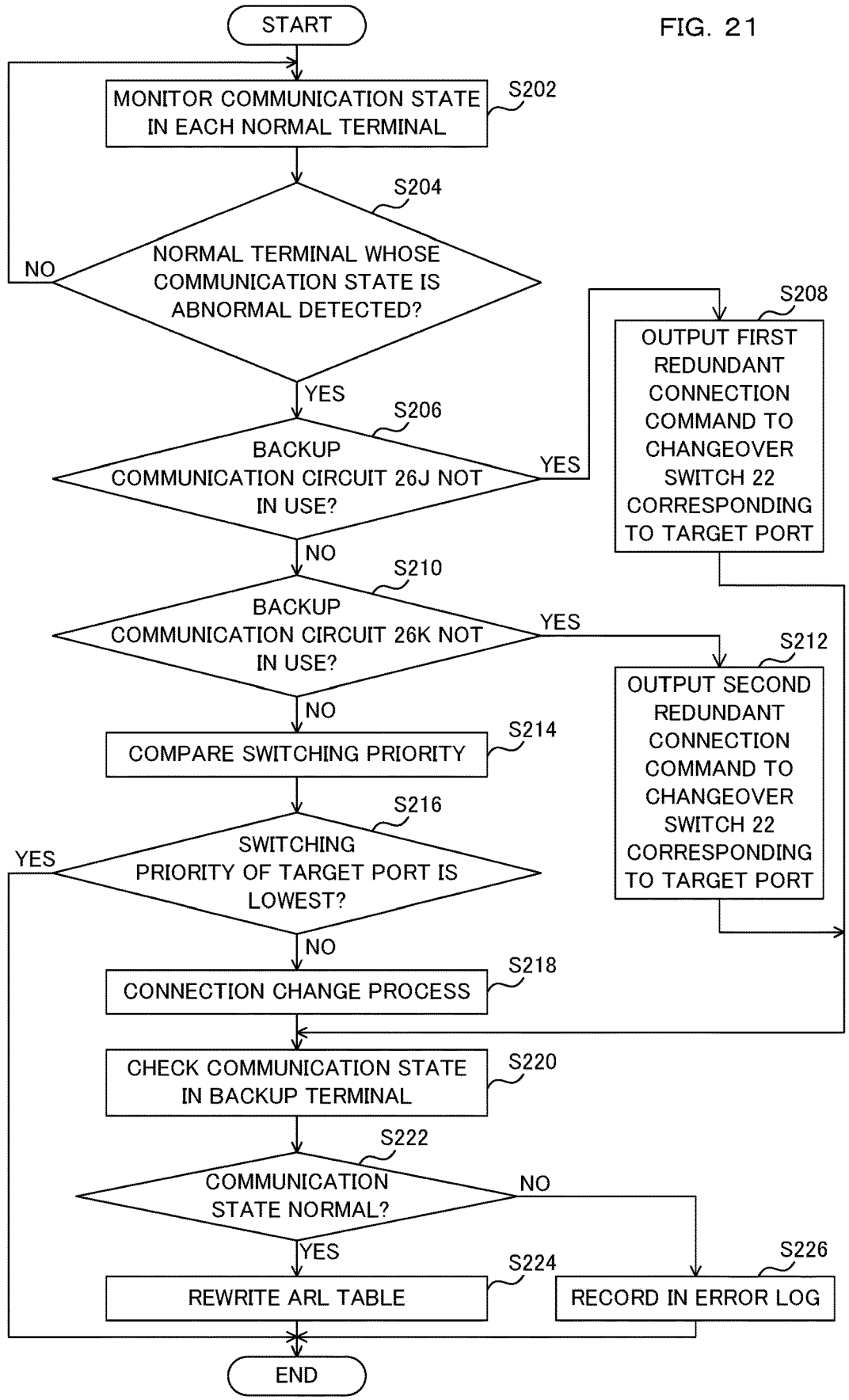
FIG. 21 is a flowchart illustrating an operation procedure when the switch device in the in-vehicle communication system according to the second embodiment of the present disclosure performs a redundant switching process.

FIG. 21 is a flowchart illustrating an operation procedure when the switch device in the in-vehicle communication system according to the second embodiment of the present disclosure performs the redundant switching process.

Referring to FIG. 21, first, the MPU 61 in the switch device 102 monitors the communication state in each normal terminal (step S202) until the normal terminal whose communication state is abnormal is detected (NO in step S204).

Then, when the normal terminal whose communication state is abnormal is detected, and the backup communication circuit 26J is not in use (YES in step S204 and YES in step S206), the MPU 61 outputs the first redundant connection command to the changeover switch 22 corresponding to the normal terminal in which the abnormality is detected, that is, the changeover switch 22 corresponding to the target port (step S208).

On the other hand, when the normal terminal whose communication state is abnormal is detected, the backup communication circuit 26J is in use, and the backup communication circuit 26K is not in use (YES in step S204, NO in step S206, and YES in step S210), the MPU 61 outputs the second redundant connection command to the changeover switch 22 corresponding to the target port (step S212).

Further, when the normal terminal whose communication state is abnormal is detected, and both of the backup communication circuits 26J and 26K are in use (YES in step S204, NO in step S206, and NO in step S210), the MPU 61 performs the following process.

That is, the MPU 61 compares the switching priority of the communication port 54 corresponding to the normal terminal in which the abnormality is detected, that is, the target port with the switching priority of the communication ports 54 electrically connected to the backup communication circuits 26J and 26K (step S214).

Then, when the switching priority of the target port is lowest, that is, the switching priority of the target port is smaller than the switching priority of the communication ports 54 electrically connected to the backup communication circuits 26J and 26K (YES in step S216), the redundant switching process ends.

On the other hand, when the switching priority of the target port is not lowest (NO in step S216), the MPU 61 performs the connection change process (step S218).

Then, when the MPU 61 performs the connection change process (step S218) or outputs the first redundant connection command or the second redundant connection command to the changeover switch 22 corresponding to the normal terminal in which an abnormality is detected (step S208 and step S212), the MPU 61 performs the following process.

That is, the MPU 61 checks the communication state in the backup terminal which is the connection target of the target backup terminal, that is, the target port (step S220).

Then, when the checked communication state is normal (YES in step S222), the MPU 61 rewrites the ARL table (step S224).

More specifically, in a case in which the unused backup communication circuit 26J is electrically connected with the target port, the MPU 61 rewrites the logical port number of the normal terminal in which an abnormality is detected with the logical port number of the first backup terminal in the ARL table.

Further, in a case in which the unused backup communication circuit 26K is electrically connected with the target port, the MPU 61 rewrites the logical port number of the normal terminal in which an abnormality is detected with the logical port number of the second backup terminal in the ARL table.

Further, in a case in which connection change process is performed, the MPU 61 rewrites the logical port number of the target backup terminal with NULL in the ARL table, and rewrites the logical port number of the normal terminal in which an abnormality is detected with the logical port number of the target backup terminal.

On the other hand, when the checked communication state is abnormal (NO in step S222), the MPU 61 records information indicating that the redundant switching has failed in an error log (step S226).

Incidentally, the order of steps S206 and S208 and steps S210 and S212 is not limited to the above example, and the order may be interchanged.

Figure 22:
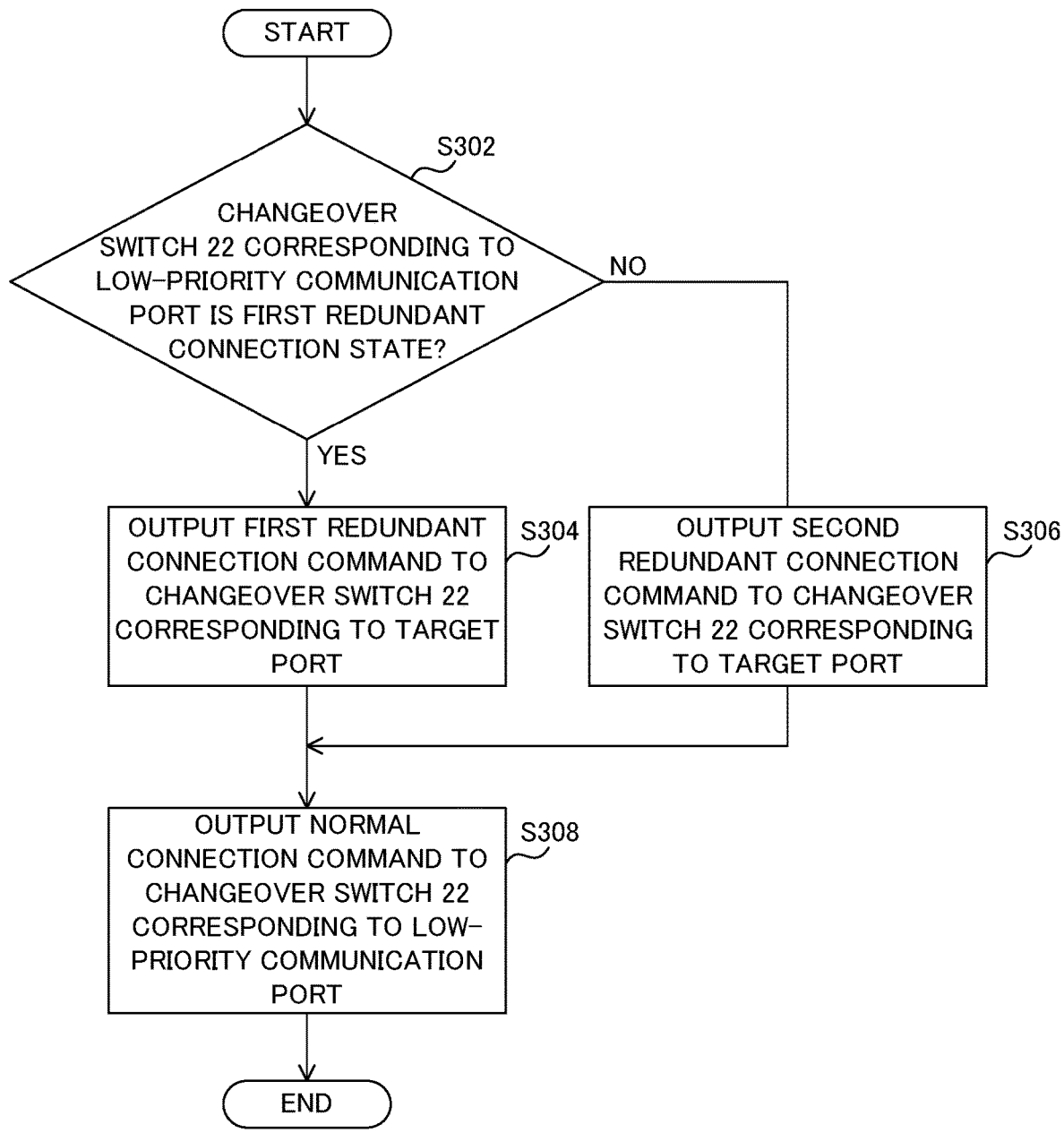
FIG. 22 is a flowchart illustrating an operation procedure when the switch device in the in-vehicle communication system according to the second embodiment of the present disclosure performs a connection change process.

FIG. 22 is a flowchart illustrating an operation procedure when the switch device in the in-vehicle communication system according to the second embodiment of the present disclosure performs the connection change process. FIG. 22 illustrates the operation in step S218 of FIG. 21 in detail.

Referring to FIG. 22, first, when the changeover switch 22 corresponding to the low-priority communication port is the first redundant connection state (YES in step S302), the MPU 61 in the switch device 102 outputs the first redundant connection command to the changeover switch 22 corresponding to the target port (step S304).

On the other hand, when the changeover switch 22 corresponding to the low-priority communication port is the second redundant connection state (NO in step S302), the MPU 61 outputs the second redundant connection command to the changeover switch 22 corresponding to the target port (step S306).

Then, the MPU 61 outputs the normal connection command to the changeover switch 22 corresponding to the low-priority communication port (step S308).

Incidentally, although the switch device according to the second embodiment of the present disclosure has a configuration in which a plurality of backup communication circuits 26 are disposed, the present disclosure is not limited to this example. The switch device 102 may have a configuration in which one backup communication circuit 26 is disposed.

Further, although the switch device according to the second embodiment of the present disclosure is configured to perform the third redundant switching, the present disclosure is not limited to this example. The switch device 101 may be configured not to perform the third redundant switching. Specifically, when both of the backup communication circuits 26J and 26K are in use, although an abnormality occurs in the communication circuit 25, the MPU 61 does not determine which of the communication ports 54 connected to the backup communication circuits 26J and 26K the communication ports 54 corresponding to the communication circuit 25 is to be connected to the backup communication circuits 26J and 26K.

Further, in the switch device according to the second embodiment of the present disclosure, the MPU 61 is configured to perform the above determination in accordance with the priority of each of a plurality of communication ports 54, but the present disclosure is not limited to this example. For example, the MPU 61 may be configured to perform the above determination in accordance with a communication volume or the like in each communication port 54.

As described above, the switch device according to the second embodiment of the present disclosure relays data in the in-vehicle network 12 and includes a plurality of communication ports 54 connectable to a plurality of functional units 111 in the vehicle 1. A plurality of communication circuits 25 are disposed corresponding to the communication port 54 and can communicate with the functional units 111 via the corresponding communication ports 54. In the switch device 102, a plurality of backup communication circuits 26 are disposed. The switching unit 63 can switch the connection destination of each communication port 54 between the corresponding communication circuit 25 and a plurality of backup communication circuits 26. Further, when the predetermined condition C1 is satisfied, the MPU 61 controls the switching unit 63 such that the connection destination of the target port which is the target communication port 54 is switched to the backup communication circuit 26.

With such a configuration, when the predetermined condition C1 such as a condition that the communication circuit 25 is unable to be used is satisfied, the connection destination of the communication port 54 corresponding to the communication circuit 25 is switched to the backup communication circuit 26, and thus the functional unit 111 connected to the communication port 54, that is, the target port can communicate with the backup communication circuit 26 via the target port, whereby the appropriate redundancy of the communication circuit 25 can be realized. Accordingly, since the functional unit 111 can continue communication with the switch device 102, it is possible to prevent transmission and reception of data between the functional unit 111 and another functional unit 111 from being not normally performed. Therefore, the more stable operation of switch device that relays data can be realized in the in-vehicle network.

Also, in the switch device according to the second embodiment of the present disclosure, when the connection destination of the target port is switched to the backup communication circuit 26, in a case in which the backup communication circuit 26 is already connected to another communication port 54, the MPU 61 determines which of the target port and another communication port 54 is to be connected to the backup communication circuit 26.

With such a configuration, for example, it is possible to maintain the connection between the backup communication circuit 26 and another communication port 54 or to switch the connection destination of the backup communication circuit 26 from the other communication port 54 to the target port on the basis of the determination result. That is, it is possible to prevent the communication port 54 connected to the backup communication circuit 26 from being fixed.

Further, in the switch device according to the second embodiment of the present disclosure, the MPU 61 performs the above determination in accordance with the respective priorities of a plurality of communication ports 54.

With such a configuration, for example, the communication port 54 with the higher priority can be connected to the backup communication circuit 26, and thus it is possible to reduce a possibility of an abnormal failure in transmission and reception of data from the functional unit 111 connected to the communication port 54 with the higher priority.

The other configurations and operations are similar to those of the switch device according to the first embodiment, and thus detailed description thereof will not be repeated here.

Next, another embodiment of the present disclosure will be described with reference to the appended drawings. Incidentally, in the drawings, the same or corresponding parts are designated by the same reference numerals, and description thereof will not be repeated.

Third Embodiment

The present embodiment relates to a switch device including a backup communication port as compared to the switch device according to the first embodiment. Except the content described below, it is similar to the switch device according to the first embodiment.

Figure 23:
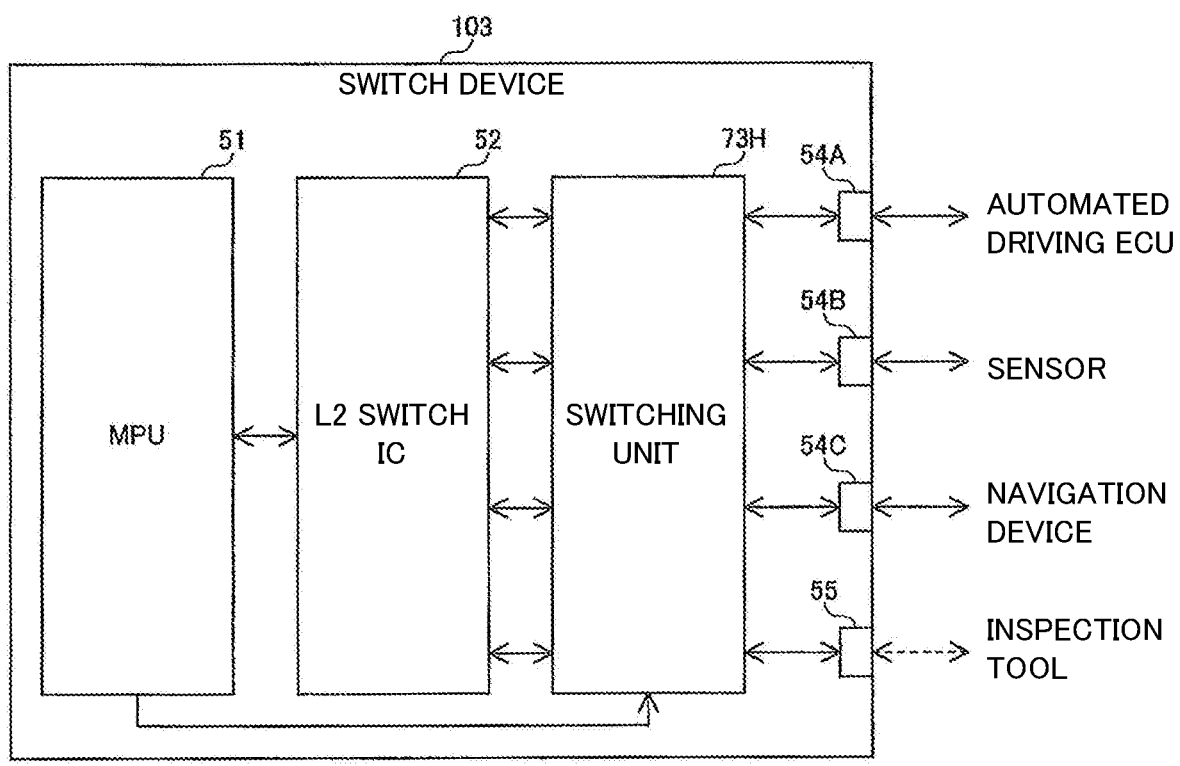
FIG. 23 is a diagram illustrating a configuration of a switch device according to a third embodiment of the present disclosure.

FIG. 23 is a diagram illustrating a configuration of a switch device according to a third embodiment of the present disclosure.

Referring to FIG. 23, a switch device 103 includes MPU (control unit) 51, an L2 switch IC 52, a switching unit 73H, communication ports (first communication port) 54A, 54B, and 54C, and a backup communication port (second communication) 55.

Operations of the MPU 51, the L2 switch IC 52, and the communication ports 54A, 54B, and 54C in the switch device 103 are similar to those of the MPU 51, the L2 switch IC 52 and the communication ports 54A, 54B, and 54C in the switch device 101 illustrated in FIG. 3.

Figure 24:
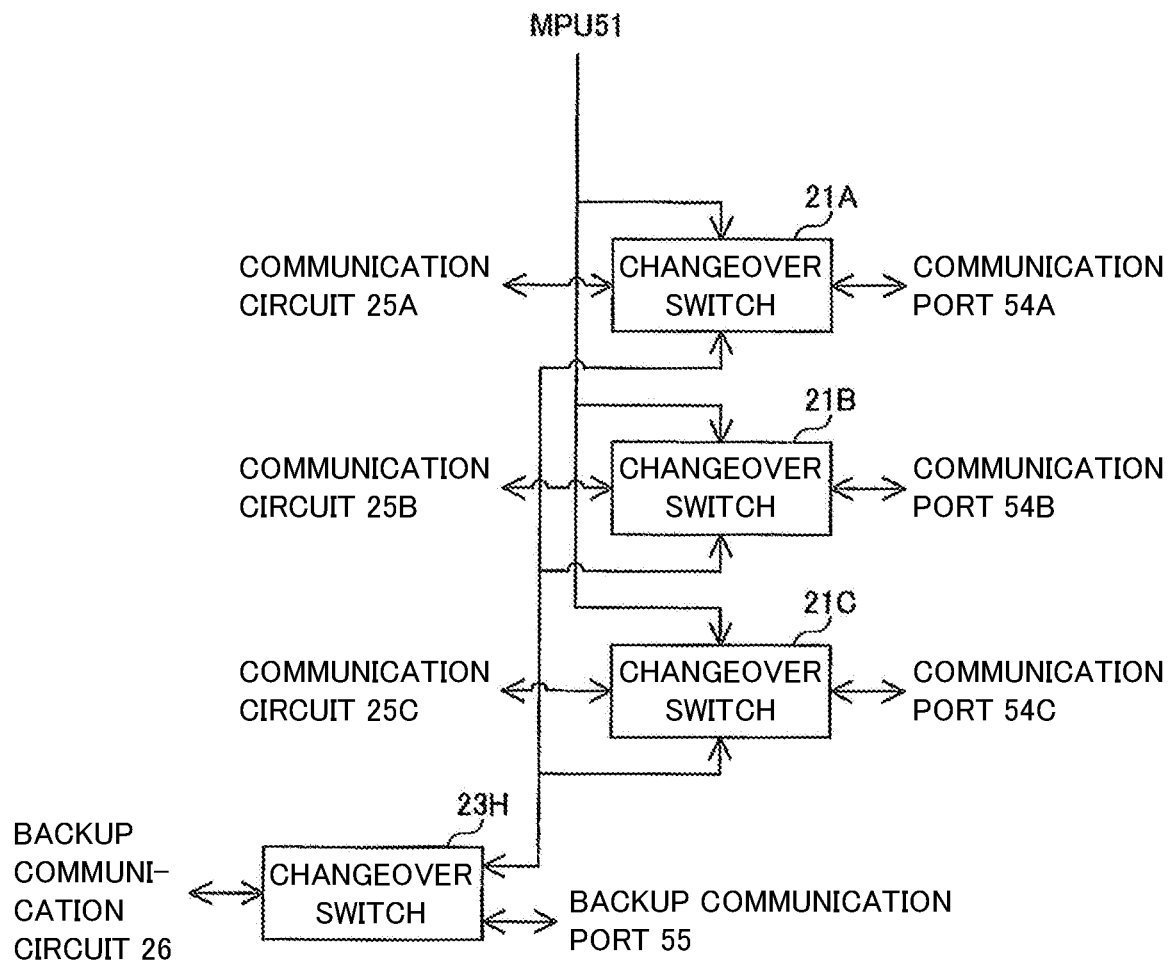
FIG. 24 is a diagram illustrating a configuration of a switching unit in the switch device according to the third embodiment of the present disclosure.

FIG. 24 is a diagram illustrating a configuration of the switching unit in the switch device according to the third embodiment of the present disclosure.

Referring to FIG. 24, the switching unit 73H includes changeover switches 21A, 21B, and 21C and a changeover switch 23H.

Configurations and operations of the changeover switches 21A, 21B, and 21C in the switching unit 73H are similar to those of the changeover switches 21A, 21B, and 21C in the switching unit 53 illustrated in FIG. 5, respectively.

For example, the switching unit 73H can switch the connection destinations of the communication ports 54A to 54C between the corresponding communication circuits 25 and the backup communication circuit 26 and can switch the presence or absence of a connection between the backup communication port 55 and the backup communication circuit 26.

Figure 25:
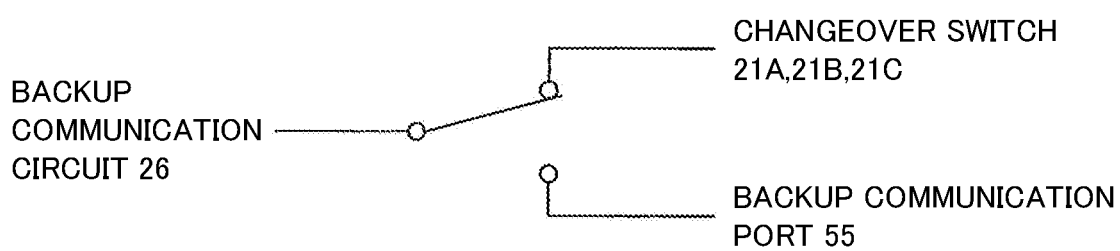
FIG. 25 is a diagram illustrating a configuration of a changeover switch in the switching unit according to the third embodiment of the present disclosure.

FIG. 25 is a diagram illustrating a configuration of the changeover switch in the switching unit according to the third embodiment of the present disclosure.

Referring to FIG. 25, the changeover switch 23H includes a first end connected to the backup communication circuit 26, a second end connected to the changeover switches 21A, 21B, and 21C, and a third end connected to the backup communication port 55.

The changeover switch 23H can switch a redundant connection state in which the first end and the second end are electrically connected and an inspection connection state in which the first end and the third end are electrically connected by a manual operation of a user, a mechanic, or the like.

Referring to FIG. 4 and FIGS. 23 to 25, for example, the backup communication circuit 26 can communicate with other devices, specifically, an inspection tool via backup communication port 55.

More specifically, the backup communication port 55 is, for example, a communication port which is not in use while the vehicle 1 is traveling.

For example, at the time of the maintenance of the vehicle 1, the user or the mechanic connects a terminal of the inspection tool with the backup communication port 55, and operates the changeover switch 23H to cause the changeover switch 23H to enter the inspection connection state. Accordingly, the inspection tool and the backup communication circuit 26 can communicate with each other.

In this state, for example, the inspection tool communicates with the MPU 51 via the backup communication port 55, the changeover switch 23H, the backup communication circuit 26, and the switch unit 24 in accordance with a communication standard of a diagnostics over IP (DoIP) and acquires an error log from the MPU 51 or updates firmware used by the MPU 51.

[Modified Example of Switch Device 103]

Although the changeover switch 23H in the switch device 103 is configured to be operated manually, the present disclosure is not limited to this example.

Figure 26:
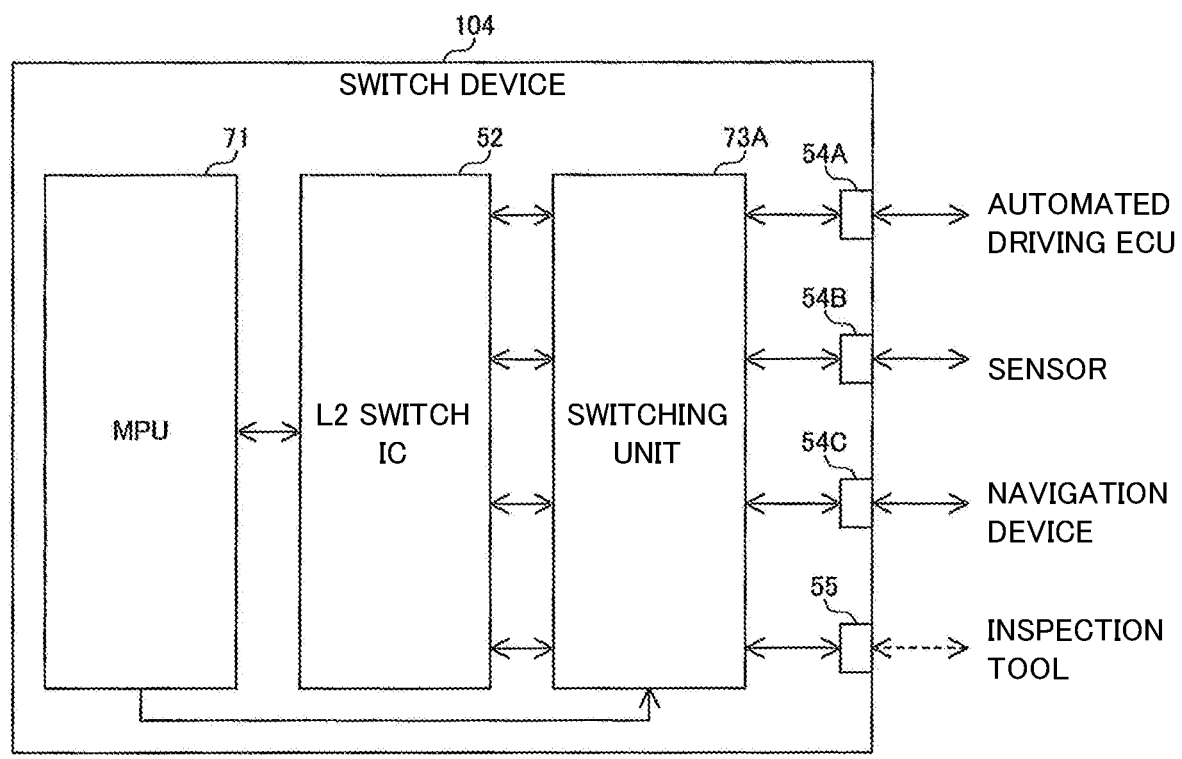
FIG. 26 is a diagram illustrating a configuration of a modified example of the switch device according to the third embodiment of the present disclosure.

FIG. 26 is a diagram illustrating a configuration of a modified example of the switch device according to the third embodiment of the present disclosure.

Referring to FIG. 26, a switch device 104 which is a modified example of switch device 103 includes an MPU (control unit) 71 and a switching unit 73A instead of the MPU 51 and the switching unit 73H as compared with the switch device 103 illustrated in FIG. 23.

The operations of the L2 switch IC 52 and the communication ports 54A, 54B, and 54C in the switch device 104 are similar to those of the L2 switch IC 52 and the communication ports 54A, 54B, and 54C in the switch device 101 illustrated in FIG. 3, respectively.

Figure 27:
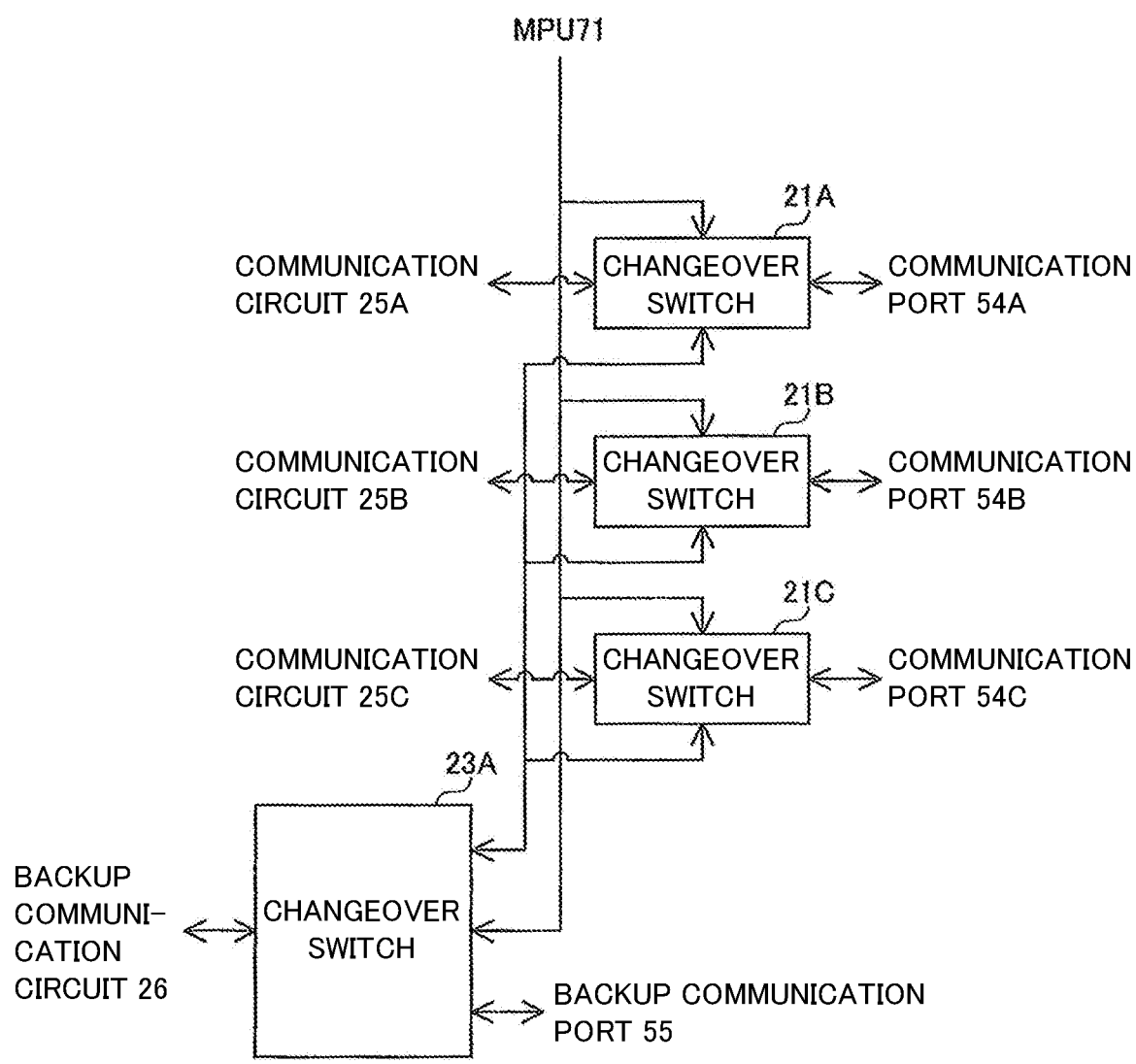
FIG. 27 is a diagram illustrating a configuration of a switching unit in the modified example of the switch device according to the third embodiment of the present disclosure.

FIG. 27 is a diagram illustrating a configuration of the switching unit in the modified example of the switch device according to the third embodiment of the present disclosure.

Referring to FIG. 27, the switching unit 73A includes changeover switches 21A, 21B, and 21C, and a changeover switch 23A.

Configurations and operations of the changeover switches 21A, 21B, and 21C in the switching unit 73A are similar to those of the changeover switches 21A, 21B, and 21C in the switching unit 53 illustrated in FIG. 5, respectively.

Referring to FIGS. 26 and 27, for example, the switching unit 73A can switch the connection destinations of the communication ports 54A to 54C between corresponding communication circuits 25 and the backup communication circuit 26 and can switch the presence or absence of the connection between the backup communication port 55 and the backup communication circuit 26.

More specifically, the changeover switches 21A to 21C in the switching unit 73A receive the normal connection command and the redundant connection command from the MPU 71 and transition to the normal connection state and the redundant connection state.

Further, the changeover switch 23A receives the redundant connection command and the inspection connection command from the MPU 71 and transitions to the redundant connection state and the inspection connection state.

In a case in which the communication circuits 25A, 25B, and 25C are operating normally, the changeover switches 21A, 21B, and 21C are set to the normal connection state by the MPU 71. Also, the changeover switch 23A is set to the inspection connection state by the MPU 71.

In this case, the communication circuits 25A, 25B, and 25C can communicate with the automated driving ECU 111A, the sensor 111B, and the navigation device 111C via the communication ports 54A, 54B, and 54C, respectively. Also, the backup communication circuit 26 can communicate with the inspection tool via the backup communication port 55.

For example, the terminal of the inspection tool and the backup communication port 55 are not connected while the vehicle 1 is traveling, but the inspection connection state of the changeover switch 23A is maintained even while the vehicle 1 is traveling.

FIG. 28 is a diagram illustrating an example of a changeover switch state table held in the MPU in the switch device according to the third embodiment of the present disclosure.

Referring to FIG. 28, the MPU 71 holds a changeover switch state table indicating a correspondence relation between the communication port 54 and the state of the corresponding changeover switch 21 and a correspondence relation between the backup communication port 55 and the state of the changeover switch 23A. In a case in which the communication circuits 25A, 25B, and 25C are operating normally, the state of all of the changeover switch 21A to 21C are the normal connection state, and the state of the changeover switch 23A is the inspection connection state.

For example, when the connection destination of the target port is switched to the backup communication circuit 26, in a case in which the backup communication circuit 26 is already connected to the backup communication port 55, the MPU 71 determines which of the target port and the backup communication port 55 is to be connected to the backup communication circuit 26.

More specifically, the MPU 71 performs the determination in accordance with, for example, the respective priorities of a plurality of communication ports 54 and the backup communication port 55.

FIG. 29 is a diagram illustrating an example of a priority table held in the MPU in the switch device according to the third embodiment of the present disclosure.

Referring to FIG. 29, the MPU 71 holds a priority table indicating a correspondence relation between the switching priority of the communication port 54 and switching priority of the backup communication port 55.

For example, the priority of the backup communication port 55 is set to the lowest priority. Specifically, the switching priorities of the communication ports 54A, 54B, and 54C are 3, 2, and 1 respectively. Also, the switching priority of the backup communication port 55 is zero. Here, as the value of the switching priority increases, the priority increases.

Therefore, the priority of the communication port 54A connected to the automated driving ECU 111A is highest, and, also, the priority of the backup communication port 55 connected to the inspection tool is lowest.

[First Redundant Switching]

FIG. 30 is a diagram illustrating an example of a changeover switch state table held in the MPU in the switch device according to the third embodiment of the present disclosure.

FIG. 31 is a diagram illustrating an example of an ARL table held in the switch unit in the switch device according to the third embodiment of the present disclosure.

In a situation in which the communication circuits 25A, 25B, and 25C operate normally, and the vehicle 1 is traveling is assumed with reference to FIGS. 26 to 31. In this situation, the switch unit 24 holds the ARL table illustrated in FIG. 7.

Here, since the terminal of the inspection tool and the backup communication port 55 are not connected in the vehicle 1 which is traveling as described above, a correspondence relation between a MAC address of the inspection tool and the output destination is not included in the ARL table as in the ARL table illustrated in FIG. 7.

For example, when an abnormality in communication in the terminal of the logical port number #3 (see FIG. 4) is detected, the MPU 71 performs the following process.

That is, the MPU 71 checks that the backup communication circuit 26 is waiting for communication with the inspection tool with reference to, for example, the switch state table illustrated in FIG. 28.

Then, for example, the MPU 71 compares the switching priority of the target port with the switching priority of the backup communication port 55 electrically connected to the backup communication circuit 26. Here, the target port is the communication port 54 corresponding to the terminal of the logical port number #3, that is, the communication port 54C.

The MPU 71 recognizes that the target port is higher in priority than the backup communication port 55 since the switching priority of the target port is 1, and the switching priority of the backup communication port 55 is zero with reference to the priority table illustrated in FIG. 29.

On the basis of the recognition result, the MPU 71 disconnects the electrical connection between the backup communication port 55 which is the low-priority communication port and the backup communication circuit 26, determines that the target port and the backup communication circuit 26 are to be electrically connected, and performs the connection change process.

More specifically, the MPU 71 disconnects the electrical connection between the low-priority communication port, that is, the backup communication port 55 and the backup communication circuit 26 by outputting the redundant connection command to the changeover switch 23A in the switching unit 73A and causing the changeover switch 23A to transition from the inspection connection state to the redundant connection state.

Also, the MPU 71 electrically connects the target port, that is, the communication port 54C and the backup communication circuit 26 by outputting the redundant connection command to the changeover switch 21C in the switching unit 73A and causing the changeover switch 21C to transition from the normal connection state to the redundant connection state.

Further, as illustrated in FIG. 30, the MPU 71 rewrites the "state of the corresponding changeover switch" corresponding to the "backup communication port 55" which is the low-priority communication port with the "redundant connection state" and rewrites the "state of the corresponding changeover switch" corresponding to the "communication port 54C" which is the target port with the "redundant connection state".

The MPU 71 checks the communication state in the terminal of the logical port number #4, that is, the first backup terminal, and when the communication state in the first backup terminal is checked to be normal, the MPU 71 rewrites the output destination corresponding to the MAC address of the navigation device 111C from #3 to #4 as illustrated in FIGS. 7 and 31.

Further, in the switch device according to the third embodiment of the present disclosure, the changeover switch 23A may be configured to be switchable manually. With such a configuration, even when the connection destination of the backup communication circuit 26 is switched to the communication port 54 by the MPU 71, the connection destination of the backup communication circuit 26 can be manually switched to the backup communication port 55 so that the inspection tool and the MPU 71 can perform communication.

As described above, the switch device according to the third embodiment of the present disclosure includes a plurality of communication ports 54 and the backup communication port 55. The backup communication circuit 26 can communicate with other devices, for example, the inspection tool via the backup communication port 55. The switching unit 73A can further switch the presence or absence of the connection between the backup communication port 55 and the backup communication circuit 26. Further, the priority of backup communication port 55 is set to the lowest priority.

With such a configuration, for example, in a case in which each communication circuit 25 operates normally, it is possible to perform the communication between the inspection tool and the switch device 104 by connecting the backup communication port 55 with the backup communication circuit 26, and in a case in which the communication circuit 25 is unable to be used, the connection destination of the backup communication circuit 26 can be automatically switched to the target port with the higher priority.

Further, the switch device according to the third embodiment of the present disclosure includes a plurality of communication ports 54 and the backup communication port 55. Further, the backup communication circuit 26 can communicate with other devices, for example, the inspection tool via the backup communication port 55.

With such a configuration, the backup communication circuit 26 can be used for communication with the inspection tool in addition to the redundant switching of the communication circuit 25.

The other configurations and operations are similar to those of the switch device according to the first embodiment, and thus detailed description thereof will not be repeated here.

Further, some or all of the components and the operations of the respective devices according to the first to third embodiments of the present disclosure may be combined appropriately.

The above embodiments should be considered as illustrative in all points and not restrictive. The scope of the present disclosure is illustrated not by the above description but by claims set forth below and are intended to include meaning equivalent to claims set forth below and all modifications within the scope.

The above description includes the features described below.

[Additional Note 1]

A switch device that relays data in an in-vehicle network and including a plurality of first communication ports which are connectable to a plurality of functional units in a vehicle, including;

a plurality of first communication circuits disposed corresponding to the first communication ports and capable of communicating with the functional units via the corresponding first communication ports;

one or more second communication circuits different from the plurality of first communication circuits;

a switching unit capable of switching a connection destination of each of the first communication ports between the corresponding first communication circuit and the second communication circuit; and a control unit that controls the switching unit such that a connection destination of a target port which is the first communication port serving as a target is switched to the second communication circuit when a predetermined condition is satisfied, in which the control unit is capable of switching a connection destination of the second communication circuit to another first communication port in a state in which the second communication circuit is connected to the first communication port.

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A switch device that relays data in an in-vehicle network and including a plurality of first communication ports which are connectable to a plurality of functional units in a vehicle, comprising:

a plurality of first communication circuits disposed corresponding to the first communication ports and capable of communicating with the functional units via the corresponding first communication ports;

one or more second communication circuits different from the plurality of first communication circuits;

a switching unit capable of switching a connection destination of each of the first communication ports between the corresponding first communication circuit and the second communication circuit; and a control unit that controls the switching unit such that a connection destination of a target port which is the first communication port serving as a target is switched to the second communication circuit when a predetermined condition is satisfied, wherein the predetermined condition is an occurrence of an abnormality in the first communication circuit, and the target port is the first communication port corresponding to the first communication circuit in which the abnormality occurs.

2. The switch device according to claim 1, wherein, when the control unit switches the connection destination of the target port to the second communication circuit, in a case in which the second communication circuit is already connected to another first communication port, the control unit determines which of the target port and the other first communication port is to be connected to the second communication circuit.

3. The switch device according to claim 2, wherein the control unit performs the determination in accordance with a priority of each of the plurality of first communication ports.

4. The switch device according to claim 1, further comprising a second communication port different from the plurality of first communication ports, wherein the second communication circuit is capable of communicating with another device via the second communication port.

5. A communication control method in a switch device that relays data in an in-vehicle network and includes a plurality of first communication ports which are connectable to a plurality of functional units in a vehicle, a plurality of first communication circuits disposed corresponding to the first communication ports and capable of communicating with the functional units via the corresponding first communication ports, one or more second communication circuits different from the plurality of first communication circuits, and a switching unit capable of switching a connection destination of each of the first communication ports between the corresponding first communication circuit and the second communication circuit, the communication control method comprising:

a step of determining whether or not a predetermined condition is satisfied; and a step of controlling the switching unit such that a connection destination of a target port which is the first communication port serving as a target is switched to the second communication circuit when the predetermined condition is satisfied, wherein the predetermined condition is an occurrence of an abnormality in the first communication circuit, and the target port is the first communication port corresponding in the first communication circuit in which the abnormality occurs.

6. A computer readable non-transitory recording medium recording a communication control program used in a switch device that relays data in an in-vehicle network and includes a plurality of first communication ports which are connectable to a plurality of functional units in a vehicle, a plurality of first communication circuits disposed corresponding to the first communication ports and capable of communicating with the functional units via the corresponding first communication ports, one or more second communication circuits different from the plurality of first communication circuits, and a switching unit capable of switching a connection destination of each of the first communication ports between the corresponding first communication circuit and the second communication circuit, the communication control program for causing a computer to function as:

a control unit that controls the switching unit such that a connection destination of a target port which is the first communication port serving as a target is switched to the second communication circuit when a predetermined condition is satisfied, wherein the predetermined condition is an occurrence of an abnormality in the first communication circuit, and the target port is the first communication port corresponding to the first communication circuit in which the abnormality occurs.

* * * * *